(12) United States Patent
Egnell

(10) Patent No.: US 6,292,136 B1
(45) Date of Patent: Sep. 18, 2001

(54) MULTI TARGET TRACKING INITIATION WITH PASSIVE ANGLE MEASUREMENTS

(75) Inventor: Henrik Egnell, Uppsala (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 09/355,503
(22) PCT Filed: Feb. 25, 1998
(86) PCT No.: PCT/SE98/00344
§ 371 Date: Sep. 14, 1999
§ 102(e) Date: Sep. 14, 1999
(87) PCT Pub. No.: WO98/38521
PCT Pub. Date: Sep. 3, 1998

(30) Foreign Application Priority Data

Feb. 27, 1997 (SE) ................................... 9700709

(51) Int. Cl.⁷ ............... G01S 5/04; G01S 13/00; G01S 13/52
(52) U.S. Cl. ............... 342/432; 342/90; 342/162
(58) Field of Search ................ 342/126, 160, 342/432, 162, 189, 90

(56) References Cited

U.S. PATENT DOCUMENTS

| | | |
|---|---|---|
| 4,806,936 | 2/1989 | Williams et al. . |
| 5,386,370 * | 1/1995 | Woo ................ 342/126 |
| 5,389,936 | 2/1995 | Alcock . |
| 5,400,264 | 3/1995 | Phillis et al. . |

FOREIGN PATENT DOCUMENTS

2558075   5/1991   (DE) .

OTHER PUBLICATIONS

Neural Network Optimization For Multi–Target Multi–Sensor Passive Tracking, Soheil Shams, Proceedings of the IEEE, vol. 84, No. 10, Oct. 1996, pp. 1442–1457.
Estimation and Tracking: Principles, Techniques, and Software, by Bar–Shalom and Li, Artech House, USA, 1993, pp. 209–221 and p. 263.
Multiple–Target Tracking With Radar Applications by Samuel S. Blackman, Artech House, USA, 1986, pp. 4–11.
Chen, Ji, et al. "A Modified Probabilistic Data Association Filter in a Real Clutter Environment", IEEE Trans. on Aerospace and Electronic Systems, vol. 32, No. 1, Jan. 1996, pp. 300–313.*
Wigren, T. et al, "Operational Multi–Sensor Tracking for Air Defense", Data Fusion Symposium, ADFS '96, Nov. 1996, pp. 13–18.*
Baltes, R. et al, "Tracking Multiple Manoeuvering Targets in a Network of Passive Radars", International Radar Conf. 1995, Jun. 1995, pp. 304–309.*

(List continued on next page.)

Primary Examiner—Gregory C. Issing
(74) Attorney, Agent, or Firm—Young & Thompson

(57) ABSTRACT

The present invention is in general related to tracking of multiple targets by means of measurements by various sensors. In particular the invention provides procedures for track initiation during multiple target tracking by means of measurements from passive sensors. The invention defines a quality measure for each tentative new target, by which the tentative targets are sorted and selected. The calculation of the parameters of possible targets and their covariance are preferably performed in a recursive manner. The track initiation comprises the steps of creating strobe tracks, calculating strobe track crosses, selecting a strobe track cross as a probable target and creating a target track.

13 Claims, 14 Drawing Sheets

OTHER PUBLICATIONS

Satish, A. et al, "Wideband Multiple Target Tracking", 1994 IEEE International Conf. on Acoustics, Speech and Signal Processing, Apr. 1994, pp. 517–520.*

Rao, C. R. et al,, "Tracking the Direction of Arrival of Multiple Moving Targets", IEEE Transactions on Signal Processing, vol. 42, No. 5, May 1994, pp. 1133–1144.*

Kosuge, Yoshio et al, "A Practical New Method for Multi–Sensor Track–to–Track Association", Proceedings of the International Conf. on Industrial Electronics, Control and Instrumentation '93, Nov. 1993, pp. 1758–1763.*

* cited by examiner

MULTI TARGET TRACKING INITIATION WITH PASSIVE ANGLE MEASUREMENTS

TECHNICAL FIELD OF THE INVENTION

The present invention relates in general to tracking of multiple targets by means of measurements from various sensors and in particular to track initiation during multiple target tracking by means of measurements from passive sensors.

PRIOR ART

Traditionally, tracking has been performed using measurements from active sensors, such as radar's or active sonar's, which report measurements from different sources. These sources may be targets of interest as well as noise or false targets. Tracking serves the object to organise the sensor data into sets of observations, hereinafter denoted tracks, produced by the same source. Once the existence of a track has been established it is possible to estimate related quantities, such as the target position, velocity, acceleration as well as other specific characteristics.

The basics of multiple target tracking include three phases; track initiation, track maintenance and track deletion. Track initiation involves processes in which a set of single measurements are collected and a likelihood that they originate from the same source is calculated. When such a probability is high enough, a track is created and associated with a probable target. Track maintenance comprises calculations of track or target characteristics, but may also be used to predict the behaviour of the target in a near future. Such estimates are often computed by filtering of a series of similar measurements over a certain time period, since the individual measurements often contain measurement errors and noise. These calculations normally involve previous measurements, condensed into the so called states of the track, or predictions as well as new measurements from the sensors. This means that once a track is created, it "consumes" new measurements, which fall close enough to the predicted characteristics of the target, and such measurements are not used to initiate new tracks.

Even if a target disappears, or at least avoids being detected, the track will survive for a certain time, in order to handle missed detection's or shorter malfunctions. However, the estimates of the track characteristics deteriorate, and so do the predictions. When the estimates and predictions become too uncertain, the track is no longer of use, and should be deleted. Such track deletion may be based on calculated uncertainty levels of the estimated track parameters or on a certain numbers of "missing" observations.

The tracking step incorporates the relevant measurements into the updated track parameter estimates. Predictions are made to the time when the next data set is to be received. This prediction constitutes the origin from which the determination of whether a new measurement fits into the track or not is made. The selection of new measurements as belonging to the track or not is known as "gating" or measurement association. The prediction typically constitutes the middle of the gate, and if the measurement falls within a certain gate width, it will for example be assumed to belong to the track. A common way to perform estimation and prediction is by employing Kalman filtering. Further references to Kalman filtering can be found in "Estimation and Tracking: Principles, Techniques, and Software" by Bar-Shalom and Li, Artech House, USA, 1993, page 209 to 221.

A description of tracking systems of prior art can e.g. be found in "Multiple-Target Tracking with Radar Applications" by Samuel S. Blackman, Artech House, USA, 1986, page 4 to 11.

In prior art multi target systems, radar is often used. Radar measurements provide information about azimuth angle and range (2D radar's), and in most cases even the elevation (3D radar's), with respect of the sensor position. It will be understood that from such measurements, estimates of target positions, velocities etc. are easily obtainable within the above described scheme.

In modern tracking systems, especially in military applications, the use of radar measurements is not solely of benefit. Since the radar is an active sensor, it radiates energy and records reflected waves, from which the position can be determined. However, such radiating sources are easily located by enemies and may therefore be destroyed by missiles or assist in the navigation of an hostile target. It is therefore advantageous if tracking would be possible to perform using only passive sensors, such as jam strobes from the targets, ESM (Electronic Support Measures) sensors or IR-/EO-sensors (infrared/ElectroOptical). A major disadvantage with the passive sensors as compared with radar is that they do not have any possibility to detect any range information from a single sensor. They will normally only provide measurements of the azimuth (1D sensor) or azimuth and elevation (2D sensor), with respect of the sensor location.

An obvious approach to overcome such a problem is to employ at least two sensors, separated by a distance, and use the combination of the measurements. By this it is possible to perform a geometrical triangulation, which at least in principle may give the absolute positions of the target as the intersection point between two measurement directions. The measurement directions are hereinafter referred to as "strobes", and the intersections are denoted as "crosses". However, if there are several targets present in the area at the same time, pure geometrical considerations are not enough to find the unique target positions, since there generally are more crosses between strobes than true targets. A cross that does not correspond to any true target is denoted a "ghost". Furthermore, since the measurements are corrupted by errors, strobes including both azimuth and elevation may not even intersect each other exactly. Thus, there is a need for a process in which the true targets among the crosses are identified and in which the ghosts are rejected.

A possible way to solve this problem is to calculate all possible crosses from all possible strobes and formulate a maximum likelihood problem. Such a problem may be solved in a conventional way by computers, but using a number of sensors tracking a number of targets will produce very large number of crosses. The computer time which is needed for such calculations will grow tremendously with the number of targets and the number of sensors, and even for relatively moderate numbers, the calculations will be impossible to perform on computers of today in real time. It is obvious for someone skilled in the art that a tracking system that cannot perform in real time is of no use.

In the U.S. Pat. No. 4,806,936 a method of determining the positions of multiple targets using bearing-only sensors only is disclosed. In this method, individual strobe measurements from three sensors are used. The intersecting bearing lines form triangles representing both true targets and ghosts. The separation of the ghosts from the true targets is performed by analysing the size and position of each triangle and in gating processes eliminate some of the ghosts. The remaining set of triangles is entered into a maximum likelihood procedure to extract the true targets. The gating process is based on simple geometrical measures, such as the difference between the individual strobes and the geometrical centre of gravity of the triangles. Such measures are however sensitive to measurement uncertainties since an uncertain measurement will enter the calculations with the same computational weight as the more accurate ones. Since the individual strobes, which normally involve large measurement uncertainties, are used for these calculations, the determinations of position of the true targets can not be performed very accurately. Furthermore, the assumption that there must exist a detection from three individual sensors will limit the range of detection significantly. It is also not obvious how to make a generalisation to more than three sensors. An obvious disadvantage with the above method is also that all the sensors have to be synchronised in order to allow a comparison between the individual strobes. Sensors working at different rates or with different offset times can not be used together with the above described method without introducing large errors.

SUMMARY OF THE INVENTION

An object of the present invention is to provide a method for multi-target tracking using passive sensor measurements from at least two sensors for track initiation, which method is possible to perform in real time and does not exhibit the above disadvantages.

The object of the present invention is achieved by a process exhibiting the features set forth in the claims. The process of the invention uses filtered strobe tracks, which give accurate angle determinations as well as angle velocities, accelerations and other relevant quantities, as the source for creating strobe track crosses. The invention preferably defines a quality measure for each strobe track cross, representing a tentative new target, by which quality measure the tentative targets are sorted and selected. The quality measure is based on the consistency of strobe track parameters, such as angles and angular velocities. The calculation of the positions, speeds and related quantities of possible strobe track crosses and the covariance of their parameters are preferably performed in a recursive manner.

DRAWINGS

Embodiments according to the present invention are presented in detail in the following, in connection with the associated drawing, in which.

DETAILED DESCRIPTION

For two vectors $u=(u_1, u_2, u_3)$ and $v=(v_1, v_2, v_3)$ in $\Re^3$ the scalar, cross and tensor product are defined as follows $$u \cdot v = u_1v_1+u_2v_2+u_3v_3,$$

$$u \times v = (u_2v_3-u_3v_2, u_3v_1-u_1v_3, u_1v_2-u_2v_1) \text{ and}$$

$$u \otimes v = \begin{pmatrix} u_1v_1 & u_1v_2 & u_1v_3 \\ u_2v_1 & u_2v_2 & u_2v_3 \\ u_3v_1 & u_3v_2 & u_3v_3 \end{pmatrix}.$$

Figure 14:
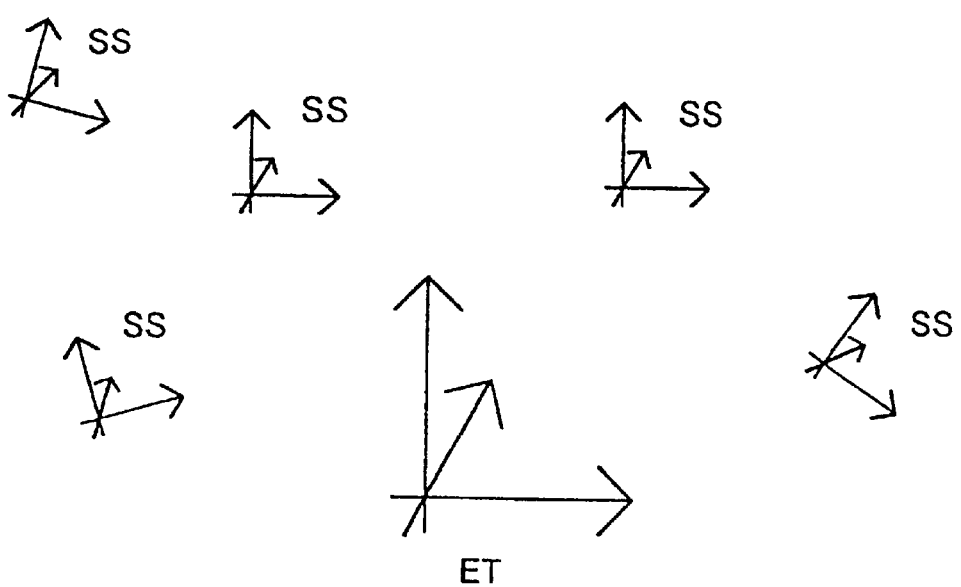
FIG. 14 illustrates the sensor and ET coordinate system.

In FIG. 14 the used coordinate systems are illustrated. The ET system is a global coordinate system where the system tracks are defined and strobe tracks from different sensors are compared and strobe track crosses are computed. Strobes and strobe tracks has a simple canonical representation in the appropriate sensor coordinate system.

The ET system is normally used with Cartesian coordinates. Each sensor is associated with a sensor coordinate system (SS), where the foot point of the sensor is positioned at the origin of the SS. The position of the foot point in the ET system is represented by a vector F. The strobe tracks in the SS has a natural expression in polar coordinates. Such a polar point has the following representation in the Cartesian system:

$$(r,\theta,\phi) \rightarrow (r\sin(\theta)\cos(\phi), r\cos(\theta)\cos(\phi), r\sin(\phi)).$$

$\theta$ represents the azimuth and ranges from 0 to $2\pi$, $\phi$ represents the elevation angle and ranges from $-\pi/2$ to $\pi/2$, where 0 corresponds to the horizontal plane, and finally r represents the range (from 0 to infinity). The linear transformation from ET to SS is given by $$TX = AX + F, \tag{1}$$

i.e a rotation A plus a translation F.

Figure 1:
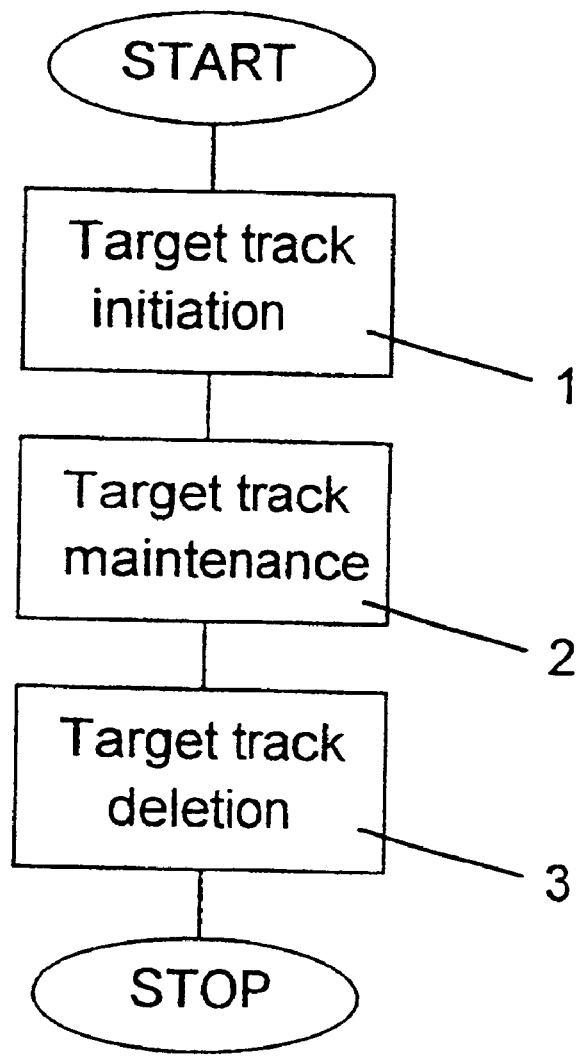
FIG. 1 is a block diagram illustrating the multi-target tracking process.

With reference to FIG. 1, the multi-target tracking process for passive sensors follows the same basic steps as in prior art tracking processes for active sensors. The process involves the steps of target track initiation 1, target track maintenance 2 and target track deletion 3.

Figure 2:
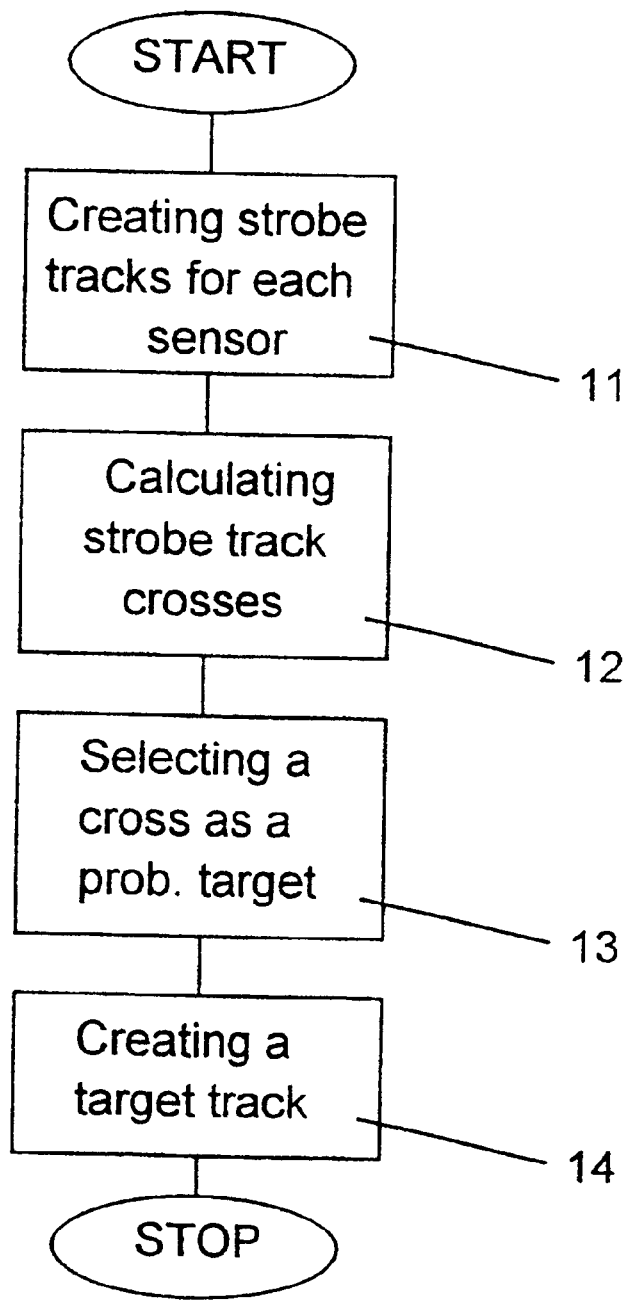
FIG. 2 is a block diagram illustrating the target track initiation process.

In FIG. 2, the main steps of the process of target track initiation according to the present invention are illustrated. The four main steps comprise creating strobe tracks 11, calculating strobe track crosses 12, selecting strobe track crosses 13 as probable targets, and finally creating a target track 14. The initiation process therefore starts with a bunch of individual strobe measurements and ends with the creation of a target track.

A strobe is defined as an individual measurement from a single sensor and comprises basically the angle to a signal source and is characterised by certain measurement time. If the sensor is of a 1D type, only the azimuth angle is available, while in the case of a 2D sensor, both the azimuth angle and the elevation angle are measured.

A strobe track is a filtered set of strobes, which belong to the same target. A strobe track is associated with a strobe track state, which comprises estimates of angle, angular velocity and other relevant parameters of the target as well as their covariances, based on the individual strobes associated with the same target. From the strobe track state, predictions to a near future is also possible to perform, assuming a certain dynamical model.

Figure 3:
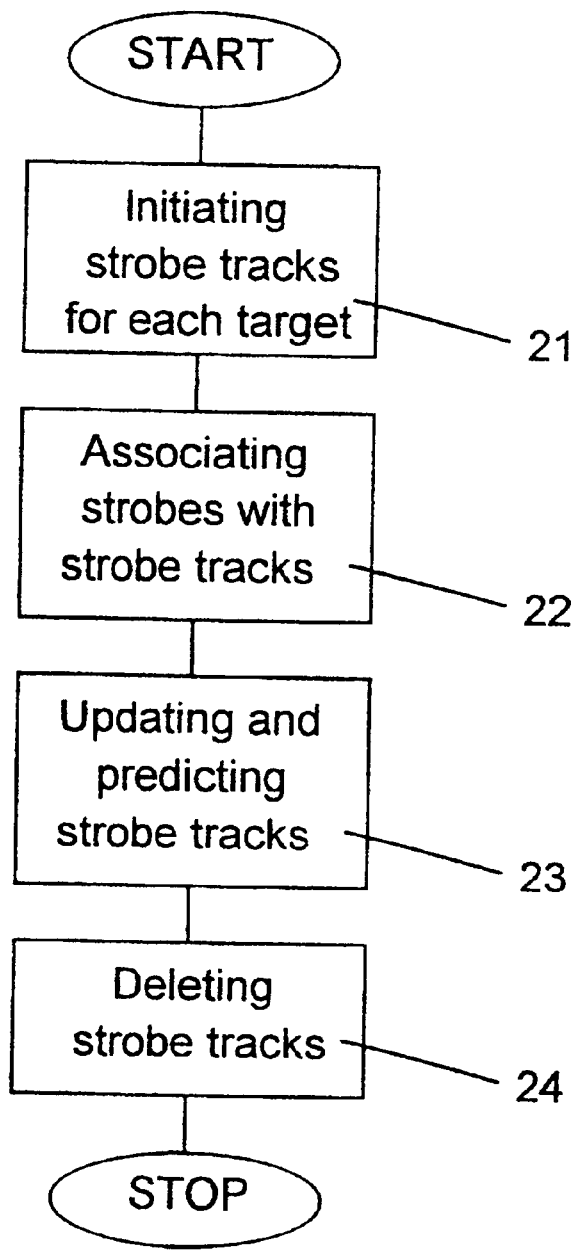
FIG. 3 is a block diagram illustrating the strobe-tracking process.

The initial step of creating strobe tracks 11 is shown in detail in FIG. 3, and follows basically the same pattern as the full tracking process using active sensors. The strobe track creation step 11 thus involves strobe track initiation 21 for each target, associating incoming strobes with appropriate strobe tracks 22, updating and predicting strobe tracks 23 and strobe track deletion 24. The strobe tracking process differs from tracking processes for active sensors in that only estimates of angular parameters are available, and not full position information. However, angles, angular velocities and, if applicable, angular accelerations are estimated within the strobe track state.

The strobe tracking process takes place for each single sensor independent of the other sensors. The whole process starts with a series of measurements from the sensor. At certain azimuth angles, and if applicable at certain elevations, detection's of a tentative target are made. The single measurements, i.e. the individual strobes, give certain values of the azimuth angle $\theta$ and in applicable cases also of the elevation angle $\phi$. Such measurements or observations are collected and when a set of measurements are consistent with each other, regarding estimated azimuth angles, azimuth angle velocities, and if applicable also elevation angle and elevation angle velocity, a strobe track is created.

When a strobe track is created, a strobe track state is defined. The strobe track state comprises estimates of angle, angular velocity and other parameters which are connected to the target, as well as their covariances. New incoming strobes are compared to the strobe track state and if the incoming strobe is consistent with the predicted parameters of the strobe track propagated to that particular measurement time, the incoming strobe is associated with the strobe track. The association process follows the methods known in the art. The incoming strobe is then used for updating the strobe tracks and for predicting the strobe track state for future measurement times. Such updating and predicting is preferably performed by filtering, which provides angle, angular velocity as well as associated covariances.

A particularly preferable way to perform the strobe track maintenance is by Kalman filtering, in which a series of estimates of strobe tracks parameters are created. Estimated values of $\theta$ and $\phi$ as well as $\dot\theta$, $\dot\phi$, $\ddot\theta$ and $\ddot\phi$ may be calculated, all referring to the local spherical coordinate system of the sensor. The Kalman filtering also has the advantage of providing the variance of the different estimates and covariance's between angles and angular velocities, thus giving an uncertainty measure of the strobe track. Once a strobe track is initiated, conventional methods of maintaining and deleting tracks are applicable. In this way, one sensor may give rise to several strobe tracks.

As an example, the following model may be used to filter azimuth or elevation in a strobe track. The state vector and its covariance is described as $$\begin{pmatrix}\theta\\\dot\theta\end{pmatrix} \text{ and } \begin{pmatrix}P_{\theta\theta} & P_{\theta\dot\theta}\\P_{\dot\theta\theta} & P_{\dot\theta\dot\theta}\end{pmatrix},$$

respectively.

The dynamic are simple and at propagation, process noise is added according to $\ddot\theta$=white noise. In discrete time for a 1D scan it is represented as $$\dot\theta(t_{i+1})=\dot\theta(t_i)+w_{\dot\theta}(t_i)$$

$$\theta(t_{i+1})=(t_{i+1}-t_i)\dot\theta(t_i)+\theta(t_i)+w_\theta(t_i)$$

where $w_\theta(t_i)$ and $w_{\dot\theta}(t_i)$ are noise corresponding to the azimuth angle and angular velocity, respectively, which model the uncertainty of the constant angular velocity motion. The covariance matrix of the noise can be for example be given by (see "Estimation and Tracking: Principles, Techniques, and Software" by Bar-Shalom and Li, Artech House, USA, 1993, page 263):

$$R=\begin{pmatrix}\frac{1}{3}(t_{i+1}-t_i)^3 & \frac{1}{2}(t_{i+1}-t_i)^2\\\frac{1}{2}(t_{i+1}-t_i)^2 & (t_{i+1}-t_i)\end{pmatrix}\sigma_v^2$$

where $\sigma v^2$ is a parameter related to the uncertainty of the model. The filter update is straight forward using the Kalman filter approach. The measurement of the azimuth angle can for example be modelled as $$z(t_i)=\theta(t_i)+e(t_i)$$

where $z(t_i)$ is the measure at time $t_i$ and where $e(t_i)$ is the measurement distribution with variance $\lambda^2$. This quantity can be obtained from sensor characteristics.

The above description fully defines the Kalman filter, as is obvious to anyone skilled in the art.

To formalise, for a sensor that yields 2D-strobes ($\theta,\phi$) (azimuth and elevation) as measurements, a 2D-strobe track is an estimator that always yield an estimate of the following quantities at any time:

$$\begin{pmatrix}\theta\\\dot\theta\end{pmatrix},\ \begin{pmatrix}P_{\theta\theta} & P_{\theta\dot\theta}\\P_{\dot\theta\theta} & P_{\dot\theta\dot\theta}\end{pmatrix} \qquad (2)$$

$$\begin{pmatrix}\varphi\\\dot\varphi\end{pmatrix},\ \begin{pmatrix}P_{\varphi\varphi} & P_{\varphi\dot\varphi}\\P_{\dot\varphi\varphi} & P_{\dot\varphi\dot\varphi}\end{pmatrix}$$

For a sensor that yields 1D-strobes ($\theta$) (azimuth) as measurements, a 1D-strobe track is an estimator that always yield an estimate of the following quantities at any time:

$$\begin{pmatrix}\theta\\\dot\theta\end{pmatrix},\ \begin{pmatrix}P_{\theta\theta} & P_{\theta\dot\theta}\\P_{\dot\theta\theta} & P_{\dot\theta\dot\theta}\end{pmatrix} \qquad (3)$$

The above described process of strobe track creation is performed for every individual sensor. Since the sensors may be of different types, having different scan times, the strobe track creation for each individual sensor is performed independent of every other sensor. That is, strobe tracks from different sensors may have different updating rates or offset times.

If no new strobes are associated with an existing strobe track, the uncertainty of the predictions deteriorate with time, and the strobe track will eventually be deleted. This may happen when a target leaves the measurement range of a sensor, disappears in any other way, or if the strobes are used in any other way, as described later. The strobe track deletion follows common procedures, and is known per se.

If there are N sensors, we denote the different sensors as D1, D2, . . . , DN. If each sensor gives rise to m1, m2, . . . , mN strobe tracks, these strobe tracks are denoted ST11, ST12, . . . , ST1m1, and ST21, ST22, . . . , ST2m2 and so on.

When a strobe track is formed, at least fairly good estimates of most of its properties are available, as well as their development in time. Since the sensors may operate with different time intervals, all strobe track have to be synchronised in order to combine information from several sensors. This is done by a central unit, collecting strobe track information from the different sensors, and propagating the estimated strobe track parameters to a common time, i.e. predicting all strobe track parameters to one specified time. This specified time is normally chosen to be equal to the last of the strobe track updating times.

These predicted strobe track parameters constitute the foundation on which the strobe track crosses are created and on which target track initiation is based. Note that also the covariance information is transformed in this manner. The information constituted by the strobe tracks propagated to a common time is normally more accurate compared to information from individual strobes, since they are filtered for averaging out statistical noise. It is also obvious that information about angular velocity, which is not available from individual strobes, is of benefit for the following analysing procedures. Last, but not least, the covariance of the strobe track parameters are of use in estimating the accuracy in the measurements, and not only statistical uncertainties, such in the case of individual strobes.

Figure 4:
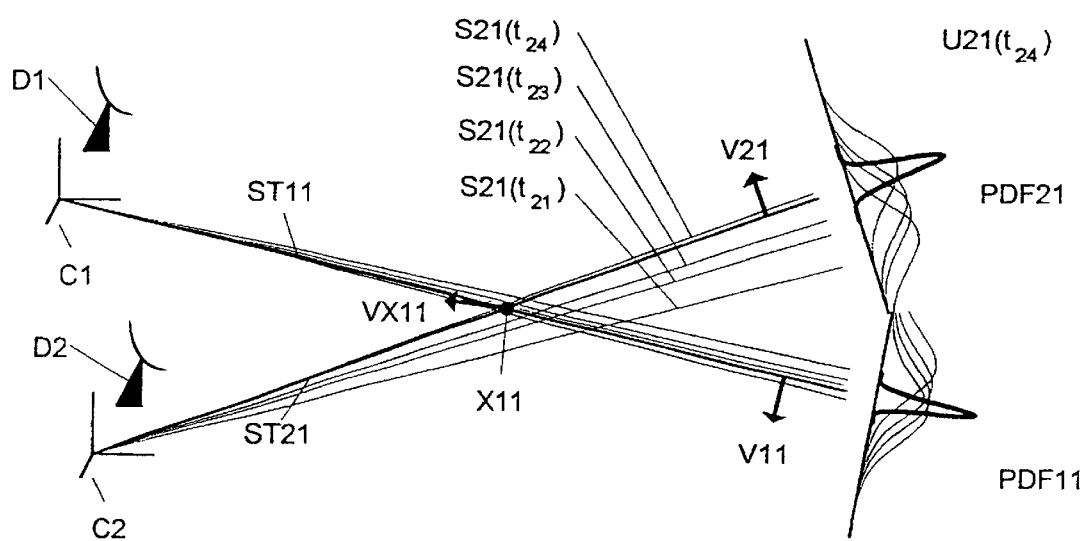
FIG. 4 is a schematic illustration of strobes and strobe tracks.

In FIG. 4 two strobe tracks ST11 and ST21 are shown as thick lines, associated with sensors D1 and D2, respectively. The uncertainty of the azimuth angle in each respective coordinate system C1 and C2 is pictured as a probability distribution function PDF11 and PDF21, respectively, at the end of each strobe track. In the same figure, a number of individual strobes associated with the strobe tracks S11 ($t_{1i}$), S21 ($t_{2i}$) are drawn with thin lines, indicating the variation of the individual measurements. The uncertainty U11 ($t_{1i}$), U21 ($t_{2i}$) of each strobe is indicated superimposed with PDF11 and PDF21. In order to simplify the figure, some of the notations are omitted. At the intersection point between the strobe tracks ST11 and ST12 a strobe track cross X11 is formed. From this picture, the advantage of using strobe tracks instead of individual strobes for creating crosses is obvious. The overall uncertainty is lower, estimates of angle velocities V11 and V12 of the strobe tracks are available, and the PDF:s are well established from the filtering process. Already at this point the strobe track cross X11 may be given a certain velocity VX11 in the global coordinate system.

The next step in the total process is thus to find the locations of the different strobe track crosses and calculate estimates of the position, velocity and other important properties of strobe track crosses. A strobe track cross, as above defined, is an intersection point or a point in the vicinity of closely positioned strobe tracks, which may correspond to the most probable position of a true target. If there are only two sensors, the strobe track crosses can only consist of an intersection or a position near the minimum distance between two strobe tracks, one strobe track from each sensor. If there are more sensors, there still exist strobe track crosses between two strobe tracks, but there will also be intersections or minimum distances between three strobe tracks or more. The order of a strobe track cross denotes the number of strobe tracks that are involved in creating the strobe track cross, i.e. a strobe track cross formed by two strobe tracks is denoted a 2nd order strobe track cross, a strobe track cross formed by three strobe tracks is denoted a 3rd order strobe track cross, and so on. A strobe track cross can be formed from at most one strobe track from each sensor. Some of these strobe track crosses represent true targets, but most of them—the ghosts—are just coincidences and do not correspond to any true target. One important object of the present invention is to provide a reliable way to eliminate these ghosts.

Figure 5:
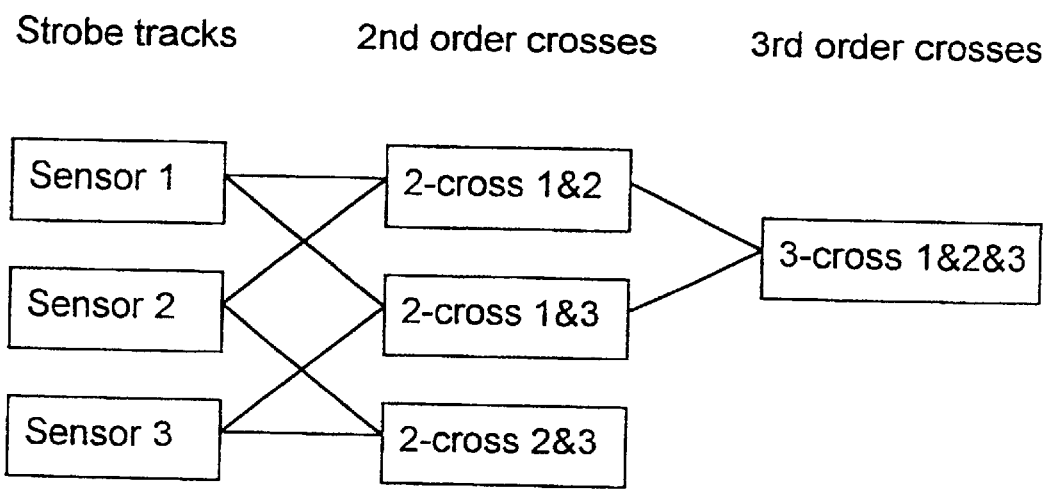
FIG. 5 is a schematic illustration of the recursive manner in which higher order strobe track crosses are calculated.

A possible way for finding the strobe track crosses is to use a pure combinatory approach and calculate all geometrical possibilities. This will for a number of targets and a number of sensors easily give a huge number of possible combinations, in fact, the problem is NP-hard, which means that the computational complexity grows faster than a polynomial function of the number of targets. A preferred approach according to the invention is instead to use a recursive scheme for calculating the strobe track crosses and their quality. With reference to FIG. 5, illustrating a case where three sensors are used, the recursive scheme starts with the calculations of the hypothetical 2nd order strobe track crosses. These calculations make use of the strobe track states from each sensor propagated to a common time, represented by data from sensor 1, sensor 2 and sensor 3, respectively. The 2nd order strobe track crosses are calculated in a manner described below, if applicable including a coarse gating procedure, and stored in the data list of strobe track crosses 1&2, strobe track crosses 1&3 and strobe track crosses 2&3, respectively. In the next step, the information gathered for the hypothetical 2nd order strobe track crosses is used for the calculation of hypothetical 3rd order strobe track crosses. This means that the data of 2-cross 1&2 and the data of 2-cross 1&3 are used to calculate hypothetical 3rd order strobe track crosses. These parameters are stored in data list of strobe track crosses 1&2&3. In this way, previous calculations are used to reduce the necessary processing power for performing the calculation of strobe track crosses.

The generalisation to calculation of higher order strobe track crosses is obvious for someone skilled in the art.

A strobe track in the two-dimensional plane may be visualised as a central line representing the estimated azimuth angle, and tails on each side of the central line, representing the decreasing probability density function values.

A 1D strobe track in the three-dimensional space, may be visualised as a central vertical plane with descending probability tails on each side. The upper and lower boundaries of the plane is only set by external considerations, such as e.g. minimum and maximum possible flight heights. The mathematical representation of a strobe track using set of variables (3) above is as follows: An orthonormal set of cylinder coordinates ($e_\rho$, $e_\theta$, $e_h$) defined as follows in the sensor system (SS)

$$e_\rho = (\sin(\theta), \cos(\theta), 0),$$

$$e_\theta = (\cos(\theta), -\sin(\theta), 0), \quad (4)$$

$$e_h = (0, 0, 1).$$

Now the strobe track can parametrised as follows:

$$l(d, h) = e_\rho d + e_h h + F, \quad d>0, \; h, \quad (5)$$

where F is the sensor foot point, i.e. the origin point of the sensor system (SS) in the ET system. The 1-dimensional distribution of the strobe track can be linearised at a point ($d_0$, $h_0$) and represented as a degenerate Gaussian distribution in $\Re^3$:

$$N(e_\rho d_0 + e_h h_0 + F, P), \quad (6)$$

where the covariance and its inverse is $$P = d_0^2 P_{\theta\theta} e_\theta \otimes e_\theta, \quad (7a)$$

$$P^{-1} = P_{\theta\theta}^{-1} e_\theta \otimes e_\theta d_0^{-2} \quad (7b)$$

and the linearised distribution function is $$f(x) = \frac{1}{\sqrt{2\pi P_{\theta\theta}}} \exp(-(x-F)P^{-1}(x-F)/2). \quad (8)$$

A 2D-strobe track in three-dimensional space may be seen as a central line specified by the estimated azimuth angle and the estimated elevation angle, which line is surrounded by a cone of the descending probability density function. The mathematical representation of a 2D-strobe track using definition (1) above is as follows: An orthonormal set of polar coordinates ($e_r$, $e_\theta$, $e_\phi$) defined as follows in the sensor system (SS)

$$e_r = (\sin(\theta)\cos(\phi), \cos(\theta)\cos(\phi), \sin(\phi)),$$
$$e_\theta = (\cos(\theta)\cos(\phi), -\sin(\theta)\cos(\phi), \sin(\phi)), \quad (9)$$
$$e_\phi = (-\sin(\theta)\sin(\phi), -\cos(\theta)\sin(\phi), \cos(\phi)).$$

Now the strobe track can parametrised as follows $$l(d) = e_r d + F, \; d > 0, \quad (10)$$

where F is the sensor foot point. The 2-dimensional distribution of the strobe track can be linearised at a point ($d_0$) and represented as a degenerate Gaussian distribution in $\mathfrak{R}^3$:

$$N(e_r d_0 + F, P), \quad (11)$$

where the covariance and its inverse is $$P = (P_{\theta\theta} \cos^2(\phi) e_\theta \otimes e_\theta + P_{\phi\phi} e_\phi \otimes e_\phi) d_0^2, \quad (12a)$$

$$P^{-1} = (P_{\theta\theta}^{-1} \cos^{-2}(\phi) e_\theta \otimes e_{\theta,r} + P_{\phi\phi}^{-1} e_\phi \otimes e_\phi) d_0^{-2} \quad (12b)$$

and the linearised distribution function is $$f(x) = \frac{1}{2\pi\sqrt{P_{\theta\theta}P_{\phi\phi}}} \exp(-(x-F)P^{-1}(x-F)/2). \quad (13)$$

For a representation in the ET-system (FIG. 15), the foot point F and the orthonormal system is computed in the ET-system (c.f. the transformation relation (1)).

If at least one sensor is a 1D sensor, a true intersection will always exist between two strobe tracks, which are not parallel or diverging. If one sensor is a 1D sensor and the other one a 2D sensor, a unique intersection point is defined, since it corresponds to an intersection between a line and a half plane in space. If both sensors are 1D sensors, the intersection will be a line, and additional information such as an assumed height must be added to achieve the full parameter set. Such a situation is diagrammed in FIG. 6. The sensors D1 and D2, working in their respective coordinate systems C1 and C2, have 1D strobe tracks ST11 and ST12, respectively, for a certain target T. The only available angle information is the azimuth angle, and the height restrictions are set by external reasons. The strobe track cross X11 will thus be a line.

If both sensors are 2D sensors, a true strobe track cross will not always exist between the lines corresponding to the estimated angles of the strobe tracks. Since the strobe track state contain uncertainties and noise, it is likely that the strobe tracks just will pass close to each other, but not intersect each other perfectly. Such a case is sketched in FIG. 7. Three strobe tracks ST11, ST21 and ST22 from two 2D sensors D1 and D2, respectively, are shown. The three cones represents the areas within which the probability density functions have values larger than a certain threshold. The strobe tracks ST11 and ST21 are not so close together that the cones intersect, and it is likely that the associated strobe track cross (X11) is not a true target. The cones representing the strobe tracks ST11 and ST22 do intersect and a most probable position selected as the strobe track cross X12.

Figure 7:
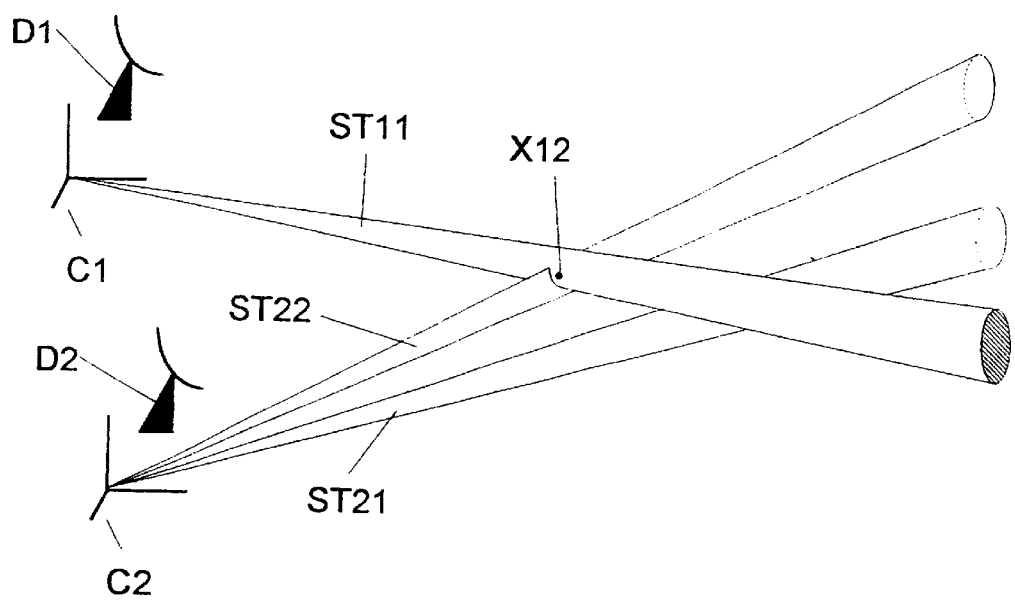
FIG. 7 is a schematic illustrating of strobe track crosses with 2D sensors.

The notation of the strobe track crosses follows the below scheme. The indices correspond to the respective sensor so that the first index corresponds to sensor number one, the second index to sensor number 2 and so on. For a system with four sensors, there will thus be four indices. The number denotes the number of the strobe track that is used to create the strobe track cross. A "0" tells that the particular sensor does not contribute to that specific strobe track cross. A 2nd order strobe track cross thus has two non-zero indices, a 3rd order strobe track cross has three non-zero indices and so on. In the example of FIG. 7, X12 means that the strobe track cross is created by the first strobe track ST11 from sensor number one D1 and the second strobe track ST22 from sensor number two D2.

In order to calculate 2nd order strobe track crosses from the strobe track states, the following procedure is preferred. First a distance between the two strobe tracks is calculated for performing a first gating. The criteria can be of any kind of distance measure, but preferably the statistical distance in a Cartesian global coordinate system is used. This preferred distance measure, between two 2D-strobe tracks, is described below.

The computation of the statistical distance between two 2D-strobe tracks is as follows. The strobe tracks are given by two half lines with the following representation (c.f. relation (10)):

$$l_i(d) = e_{r,i} d + F_i, \; d > 0, \; i=1,2. \quad (14)$$

The shortest geometrical distance between the strobe tracks is given by $$d^2(l_1, l_2) = \inf_{d_1, d_2 > 0} (e_{r,1} d_1 + F_1 - e_{r,2} d_2 - F_2)^2. \quad (15)$$

The $d_1, d_2$ that yield the infimum above gives the point on the strobe track that is closest to the other strobe track. Their numerical value is the distance of that point to the sensor position.

Given fixed $d_1, d_2$ that yields the min distance above, the linearised statistical distance between the strobe tracks can be computed as $$StatDist = \frac{\Delta}{\sqrt{P}} \quad (16)$$

where
$\Delta = (F_1 - F_2) \cdot e_0$,
$P = (P_{\theta\theta,1} (e_0 \cdot e_{\theta,1})^2 + P_{\phi\phi,1} (e_0 \cdot e_{\phi,1})^2) d_1^2 + (P_{\theta\theta,2} (e_0 \cdot e_{\theta,2})^2 + P_{\phi\phi,2} (e_0 \cdot e_{\phi,2})^2) d_2^2$
$e_0 = e_{r,1} \times e_{r,2}$.

The calculated statistical distance value is compared to a predetermined threshold value, and if the calculated distance value exceeds the threshold, the pair of strobe tracks is very unlikely as a candidate for a strobe track cross and is rejected. The predetermined value could be a fixed value, a value chosen by the operator, a value depending on the uncertainties of the strobe track states or a combination thereof.

If the pair of strobe tracks pass this first gating process, a closest point on respective strobe track, which corresponds to the calculated minimum distance, is chosen. From these point positions, a point-to-sensor distance between each closest point and each respective sensor is calculated. These point-to-sensor distances, $d_1$ and $d_2$, respectively, are compared to the expected range of each respective sensor, and if at least one of these point-to-sensor distances exceeds the range of the respective sensor, the pair of strobe tracks is assumed to be associated with a ghost cross and is subsequently rejected.

The remaining pairs of strobe tracks, which have passed the two coarse gating processes described above, will give rise to a 2nd order strobe track cross. The strobe track cross position and the associated uncertainty is calculated. This calculation uses the information which is available from the strobe track states. Since not only the estimated angles are available, but also estimated angular velocities and covariance's associated with these parameters, the calculated strobe track cross position does not necessarily have to be the geometrical mean value of the closest points on the two strobe tracks. One may also consider the probability density functions as well as other aspects. In this calculation, a transformation is made from the respective local sensor coordinate systems, normally in spherical coordinates, to a global coordinate system, usually in Cartesian coordinates.

The preferred way to perform these calculations are as follows. With the notation from above we have for 2D-strobe tracks (c.f. relations (12a) and (12b)):

$$P_i = (P_{\theta\theta,i} \cos^2(\phi_i) e_{\theta,i} \otimes e_{\theta,i} + P_{\phi\phi,i} e_{\phi,i} \otimes e_{\phi,i}) d_i^2, \quad (17a)$$

$$P_i^{-1} = (P_{\theta\theta,i}^{-1} \cos^{-2}(\phi) e_{\theta,i} \otimes e_{\theta,i} + P_{\theta\theta,i}^{-1} e_{\phi,i} \otimes e_{\phi,i}) d_i^{-2}, \quad (17b)$$

and for 1D-strobe tracks (c.f. relations (7a) and (7b)):

$$P_i = P_{\theta\theta,i} e_{\theta,i} \otimes e_{\theta,i} d_i^2, \quad (18a)$$

$$P_i^{-1} = P_{\theta\theta,i}^{-1} e_{\theta,i} \otimes e_{\theta,i} d_i^{-2}, \quad (18b)$$

for the two strobe tracks i=1,2. The estimated strobe track cross position and its covariance is given by $$X = (P_1^{-1} + P_2^{-1})^{-1} (P_1^{-1} F_1 + P_2^{-1} F_2),$$

$$P = (P_1^{-1} + P_2^{-1})^{-1}. \quad (19)$$

When computing the estimated position X and its covariance P, the entries must be represented in the same coordinate system, preferably the ET system.

If both strobe tracks are 1D, then we need to add a fictions observation at a default height and an uncertainty that covers all altitudes of interest. This is achieved by $$X = (P_h^{-1} + P_1^{-1} + P_2^{-1})^{-1} (P_h^{-1} X_0 + P_1^{-1} F_1 + P_2^{-1} F_2),$$

$$P = (P_h^{-1} + P_1^{-1} + P_2^{-1})^{-1}. \quad (20)$$

Where $$P_h = P_{RR} e_R \otimes e_R,$$

$e_R$ is a unit vector pointing to the centre of the earth at the approximate target position, and $X_0$ is the a priori height and $P_{RR}$ is the a priori height covariance.

From the above described calculations, the covariance matrix between the different parameters as well as the probability density function of all parameters are acquired.

The next step in the recursive method of calculating strobe track crosses, uses the 2nd order strobe track crosses to calculate higher order strobe track crosses. Strobe track crosses of order n is thus calculated by using the information associated with strobe track crosses of order n−1, where n>2.

First, combinations of strobe track crosses of order n−1 are selected to cover all possible combinations of possible strobe track crosses of order n. These pairs of (n−1)th order strobe track crosses are based on n−2 common original strobe tracks and the total number of used strobe tracks are therefore n. A distance between two strobe track crosses of order n−1 is calculated for performing a gating. The gating criteria can be use any kind of distance measure, but preferably the statistical distance in a Cartesian global coordinate system is used. This preferred distance measure is as follows. If the two 2-crosses are represented by $(X_1, P_1)$ and $(X_2, P_2)$, then the distance is the standard statistical distance:

$$\sqrt{(X_1 - X_2)(P_1 + P_2)^{-1}(X_1 - X_2)}. \quad (21)$$

Note that the two distributions are not independent. However, for a coarse gating process it is operating satisfactorily.

The calculated minimum distance value is compared to a predetermined threshold value, and if the calculated minimum distance value exceeds the threshold, the pair of strobe track crosses of order n−1 is very unlikely as a candidate for a strobe track cross of order n and is thus rejected. The predetermined value could be a fixed value, a value chosen by the operator, a value depending on the uncertainties of the strobe track states or a combination thereof.

The remaining pairs of strobe track crosses of order n−1, which have passed the coarse gating processes described above, will give rise to a nth order strobe track cross. The strobe track cross position and the associated uncertainty is calculated. This calculation uses the information which is available from the strobe track crosses of order (n−1). These calculations may be performed directly from the original strobe track states, but since many of the desired calculations already are performed during the calculation of the strobe track crosses of order n−1, many results may be used directly. Since not only the estimated angles of the strobe track states are available, but also estimated angular velocities and covariance's associated with these parameters, the calculated strobe track cross position does not necessarily have to be the geometrical mean value of the closest points on the two strobe tracks. One may also consider the probability density functions as well as other aspects.

The preferred way to perform these calculations are as follows. We have for 2D-strobe tracks (c.f. (12b)):

$$P_i^{-1} = (P_{\theta\theta,i}^{-1} \cos^{-2}(\phi) e_{\theta,i} \otimes e_{\theta,i} + P_{\phi\phi,i}^{-1} e_{\phi,i} \otimes e_{\phi,i}) d_i^{-2}, \quad (22)$$

and for 1D-strobe tracks (c.f. (7b)):

$$P_i^{-1} = (P_{\theta\theta,i}^{-1} e_{\theta,i} \otimes e_{\theta,i}) d_i^{-2}, \quad (23)$$

for the n strobe tracks, i=1, 2 . . . n. Then the estimated position and its covariance is given by $$X = \left(\sum_{i=1}^{n} P_i^{-1}\right)^{-1} \left(\sum_{i=1}^{n} P_i^{-1} F_i\right), \quad (24)$$

-continued $$P = \left(\sum_{i=1}^{n} P_i^{-1}\right)^{-1}.$$

If all strobe tracks are 1D, then it is required to add a fictions observation at a default height and an uncertainty that covers all altitudes of interest as described above. The result is then $$X = \left(P_h^{-1} + \sum_{i=1}^{n} P_i^{-1}\right)^{-1} \left(P_h^{-1} X_0 + \sum_{i=1}^{n} P_i^{-1} F_i\right), \quad (25)$$

$$P = \left(P_h^{-1} + \sum_{i=1}^{n} P_i^{-1}\right)^{-1},$$

with the same $P_h$ and $X_0$ as above. From the above described calculations, the covariance matrix between the different parameters, as well as the probability density function of all parameters are acquired for the strobe track crosses of order n.

Figure 8:
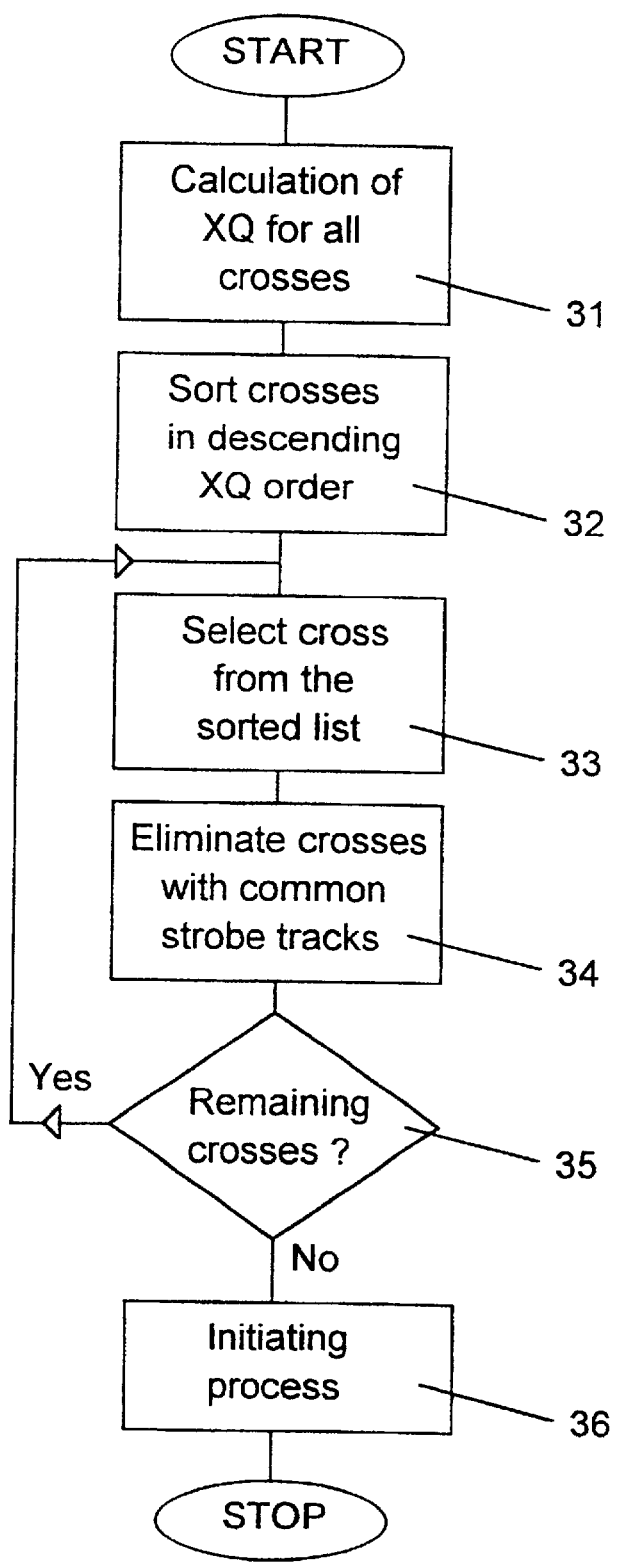
FIG. 8 is a block diagram illustrating the selection of strobe track crosses as probable targets.

The next step in the initiation procedure is the step of selecting one strobe track cross as a tentative target 13 (FIG. 2). According to the present invention there should be a process in which the most probable strobe track cross is selected. In a preferred embodiment of the invention, this selection is performed by defining a so called cross quality (XQ) value and to calculate this value for each strobe track cross. FIG. 8 shows a block diagram illustrating the selecting step. The process starts with the calculation of the XQ value for all strobe track crosses 31. In the next step, the strobe track crosses are sorted in descending XQ order 32 into a list of tentative targets. From this list, at least one strobe track cross is selected as a probable target. This step is shown in FIG. 8 as step 33. Preferably the first strobe track cross in the list, i.e. the strobe track cross with the highest XQ value is selected. Once a strobe track has been used to create a target track, the strobe track is unlikely to participate in any target. It is therefore very likely that the strobe tracks contributing to the selected strobe track cross only participate in ghost crosses beside the selected strobe track cross. Strobe track crosses that have contributions from at least one of the strobe tracks, which contribute to the selected strobe track cross, are therefore assumed to be ghosts and are subsequently eliminated from the list in step 34. If there is only one target present, the elimination step 34 will empty the list of strobe track crosses. However, if there are more targets to be identified, some strobe track crosses remain. Step 35 will examine if there are any strobe track crosses left in the list, and in such a case the process returns to step 33 again to select another strobe track cross for another probable target. If the list is empty, the process continues to step 36 which is a target track initiating step. This step will be discussed more in detail below.

The calculation should preferably consider the consistency of the parameters of the strobe track cross, especially if compared with other strobe track crosses using the same strobe tracks. The cross quality could also consider the order of the strobe track cross, since a higher order strobe track cross in general is more probable to correspond to a true target than a lower order strobe track cross. The parameters which should be considered comprise in general positions and velocities, but could also comprise other characteristic parameters detectable by the sensors, such as the type of the target (if available) etc.

In the preferred embodiment of this invention, the cross quality value calculation is based on the probability density functions of the strobe tracks contributing to the strobe track cross. Since most of the quantities for such calculations already have been calculated during the strobe track cross position calculations, such part results may be used and the XQ value calculation can be made comparatively fast. The following cross quality definition is preferred.

Given a strobe track cross $X = X_{i_1, i_2, \ldots, i_n}$ of order n, formed from strobe tracks $\{ST_{k,i_k}\}_{k=1, \ldots, n}$, the quality can be computed the as:

$$XQ(X) = \prod_{k=1\ldots n} XQ(ST_{k,i_k}), \quad (26)$$

where $$XQ(ST_{k,i_k}) = \frac{f_k(X)P(X)}{\sum_{X' \in ST_{k,i_k}} f_k(X')P(X') + \rho(ST_{k,i_k})P(ST_{k,i_k})}. \quad (27)$$

The sum runs over all strobe track crosses that the strobe track contributes to and $f_k(X)$ is the distribution associated with the strobe track, linearised and computed at the estimated location. The density $\rho$ gives the probability that a target is seen by one sensor only, and is normally a constant.

The a priori probabilities P(X), P(ST) can be taken from different sources. The information that tentative targets has been seen in a particular region can be used to increase the value, or if it is unlikely to be any targets in a region the value is lowered. However, the main purpose is to increase the probability for strobe track crosses with many strobe tracks, i.e. a strobe track cross of order n is more likely than a strobe track cross of order n−1. This is an ad hoc method, which is due to approximations in design. For example, the XQ value for a $2^{nd}$ order strobe track cross is not decreased if it is not seen by a sensor which should be able to see it. A simple approach is to set $P(X) = C^n$, where n is the order of the strobe track cross.

The initiating step 36 is described in more detail with reference to FIG. 9. One way to proceed is to let all the selected strobe track crosses result in initiation of a new target track. The selected strobe track crosses are, however, associated with useful information, e.g. the cross quality value and the order of the strobe track cross. This information may be further used for controlling the further processing of the strobe track crosses. In many cases, a predetermined minimum XQ value may exist, under which the strobe track cross is assumed to be too uncertain. Strobe track crosses which exhibit XQ values below this threshold could for instance just be shown as marks at the operator monitor. In some cases, the operator might want to participate in the evaluation process of the strobe track crosses. Operator experience could be very useful in separating true targets from ghosts. Strobe track crosses with very high XQ values or of a very high order may automatically be left for automatic target track initiation. Lower XQ values or e.g. only 2nd order strobe track crosses might be presented for the operator to make an approval before initiation.

Figure 9:
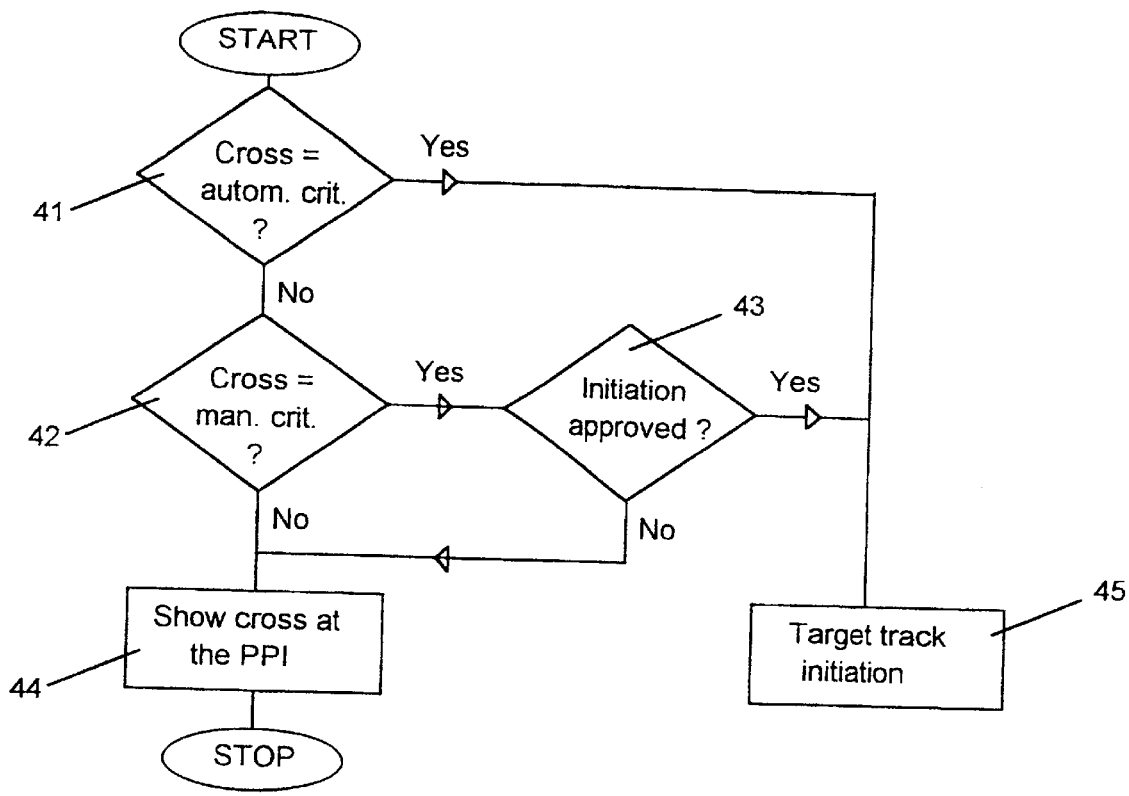
FIG. 9 is a block diagram illustrating the initiation process.

FIG. 9 shows a preferred embodiment of the initiation process. In step 41, it is decided if the strobe track cross fulfils the criterion for automatic target track initiation. If the criterion is not fulfilled, the next step 42 is to compare the information associated with the strobe track cross to the criterion for allowing for a manual approval for target track initiation. Both of these criteria could involve the XQ value, the order of the strobe track cross, or both. If the criterion for a manual approval is fulfilled, the process waits for the operator to decide on if the strobe track cross is approved for a target track or not, represented by step 43. If the operator denies approval or if none of the criteria are fulfilled, the strobe track cross is rejected as a target candidate and is only shown as a mark at the operator monitor (step 44). If the strobe track cross is accepted as a candidate for a new target track, the process continues with the actual target track initiation, step 45, which is the same step as step 14 in FIG. 2.

The actual creation of the tracks is described below. The strobe tracks contributing to the selected strobe track cross contain information about angles and angular velocities of the strobe tracks as well as their covariance's. From this amount of information a target track vector is formed, containing e.g. a position, velocity and optionally acceleration of the target. These parameters are preferably calculated in a global tracking coordinate system (c.f. FIG. 14). Besides the target track vector itself, the strobe tracks may contribute in forming a covariance matrix to the target track vector. From this initial target track vector and its covariance matrix, a conventional tracking operation can be started.

A preferred way to calculate the target track vector and its covariance matrix in a Cartesian coordinate system can be as follows. To initiate a Kalman filter we need to specify the six dimensional state vector $(x,\dot{x})$ and its covariance $$\begin{pmatrix} P_{xx} & P_{x\dot{x}} \\ P_{\dot{x}x} & P_{\dot{x}\dot{x}} \end{pmatrix}$$

(a 6×6 matrix). The estimators for the state vector is $$x = \left(\sum_{i=1}^{n} P_i^{-1}\right)^{-1} \left(\sum_{i=1}^{n} P_i^{-1} F_i\right), \tag{28}$$

$$\dot{x} = \left(\sum_{i=1}^{n} P_i^{-1}\right)^{-1} \left(\sum_{i=1}^{n} P_i^{-1} m_i\right), \tag{29}$$

where $$m_i = d_i(\dot{\theta}_i \cos(\phi_i) e_{\theta,i} + \dot{\phi}_i e_{\phi,i}) \tag{30}$$

for a 2D-strobe track and $$m_i = d_i \dot{\theta}_i e_{\theta,i} \tag{31}$$

for a 1D-strobe track. The covariance is estimated as follows:

$$P_{xx} = \left(\sum_{k=1}^{n} P_k^{-1}\right)^{-1}, \tag{32}$$

$$P_{\dot{x}\dot{x}} = \left(\sum_{k=1}^{n} P_k^{-1}\right)^{-1} \left(\sum_{k=1}^{n} P_k^{-1} V_k P_k^{-1}\right) \left(\sum_{k=1}^{n} P_k^{-1}\right)^{-1},$$

$$P_{\dot{x}x} = \left(\sum_{k=1}^{n} P_k^{-1}\right)^{-1} \left(\sum_{k=1}^{n} P_k^{-1} M_k P_k^{-1}\right) \left(\sum_{k=1}^{n} P_k^{-1}\right)^{-1},$$

with $$V \approx (P_{\theta\theta} \cos^2(\phi) e_\theta \otimes e_\theta + P_{\phi\phi} e_\phi \otimes e_\phi) d^2,$$

$$M \approx (P_{\theta\theta} \cos^2(\phi) e_\theta \otimes e_\theta + P_{\phi\phi} e_\phi \otimes e_\phi) d^2$$

for 2D-strobe tracks and $$V \approx P_{\theta\theta} e_\theta \otimes e_\theta d^2,$$

$$M \approx P_{\theta\theta} e_\theta \otimes e_\theta d^2$$

for 1D-strobe tracks. The formulas above can be simplified using the approximations $$P^{-1}VP^{-1} \approx \left(\frac{P_{\theta\theta}}{P_{\theta\theta}^2 \cos^2(\varphi)} e_\theta \otimes e_\theta + \frac{P_{\varphi\varphi}}{P_{\varphi\varphi}^2} e_\varphi \otimes e_\varphi\right) d^{-2},$$

$$P^{-1}MP^{-1} \approx \left(\frac{P_{\theta\theta}}{P_{\theta\theta}^2 \cos^2(\varphi)} e_\theta \otimes e_\theta + \frac{P_{\varphi\varphi}}{P_{\varphi\varphi}^2} e_\varphi \otimes e_\varphi\right) d^{-2}$$

for 2D-strobe tracks and $$P^{-1}VP^{-1} \approx \frac{P_{\theta\theta}}{P_{\theta\theta}^2} e_\theta \otimes e_\theta d^{-2},$$

$$P^{-1}MP^{-1} \approx \frac{P_{\theta\theta}}{P_{\theta\theta}^2} e_\theta \otimes e_\theta d^{-2}$$

for 1D-strobe tracks. If all strobe tracks above are 1D then we also need to add the stabilising factor $P_h$ to position the strobe track cross at an a priori height.

Once a target track is established, the maintenance is quite similar to prior art. The target tracks are updated by suitable individual sensor strobes, which fall within a gate around the target. The sensor strobes which are used in this way are thereafter eliminated and do therefore not participate in maintaining the strobe tracks. This means that when a target track is established it will consume relevant sensor strobes and cause the corresponding strobe tracks to starve and subsequently be deleted. In connection with this, the amount of calculation will be reduced.

When a target disappears, or leaves the area of interest, the target track should also be deleted. As in previous techniques, this will be the case when there are not enough new strobes to keep the target track uncertainties below a certain level, or if a certain time period has elapsed since the last useful strobe.

Some details of the initiation process will be described in detail by means of a few explanatory examples.

EXAMPLE 1

Figure 10:
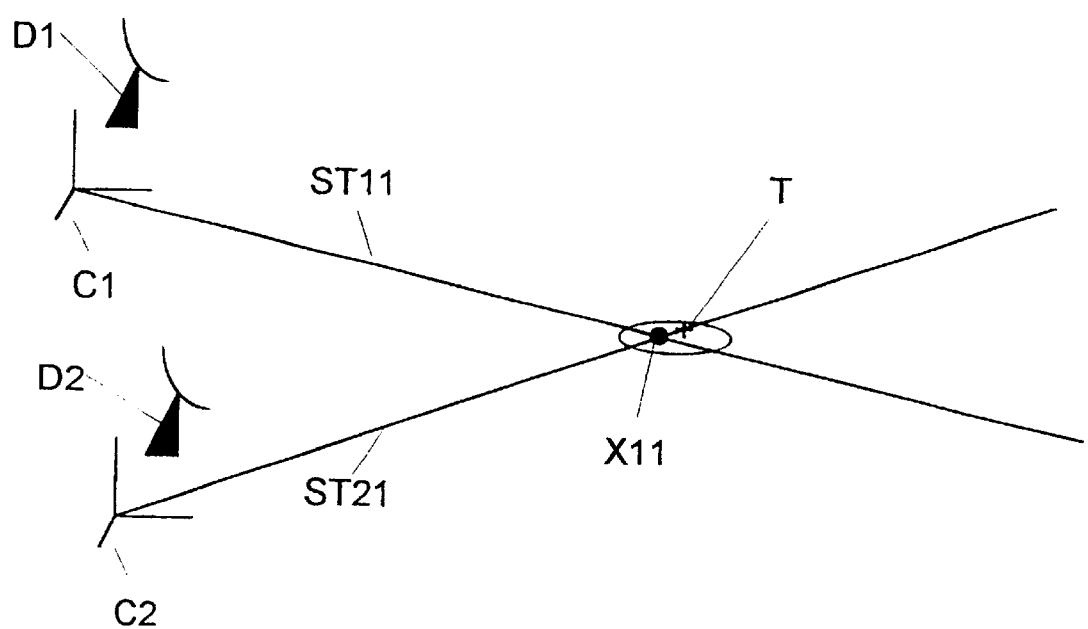
FIG. 10 is diagrammatic illustration of a tracking situation with two sensors and one true target.

This example is described with references to FIG. 10. In this example, the tracking system consists of two 2D sensors D1 and D2, working in their local coordinate systems C1 and C2, respectively. One single true target T is present within the range of the sensors. Sensor D1 obtains a series of strobes associated with the target T and a strobe track ST11 is initiated. The strobe track state yields estimates of azimuth angle, angular velocity, elevation angle and angular and a covariance, c.f. (2):

$$\begin{pmatrix} \theta_1 \\ \dot{\theta}_1 \end{pmatrix}, \quad \begin{pmatrix} P_{\theta\theta,1} & P_{\theta\dot{\theta},1} \\ P_{\dot{\theta}\theta,1} & P_{\dot{\theta}\dot{\theta},1} \end{pmatrix}$$

$$\begin{pmatrix} \varphi_1 \\ \dot{\varphi}_1 \end{pmatrix}, \quad \begin{pmatrix} P_{\varphi\varphi,1} & P_{\varphi\dot{\varphi},1} \\ P_{\dot{\varphi}\varphi,1} & P_{\dot{\varphi}\dot{\varphi},1} \end{pmatrix}.$$

In a similar way, sensor D2 initiates a strobe track ST21, with corresponding estimates but with index 1 replaced by 2. Next, the representation of the strobe track is computed in the sensor system (SS) according to (9):

$$e_{r,1} = (\sin(\theta_1)\cos(\phi_1), \cos(\theta_1)\cos(\phi_1), \sin(\phi_1)),$$

$$e_{\theta,1} = (\cos(\theta_1)\cos(\phi_1), -\sin(\theta_1)\cos(\phi_1), \sin(\phi_1)),$$

$$e_{\phi,1} = (-\sin(\theta_1)\sin(\phi_1), -\cos(\theta_1)\sin(\phi_1), \cos(\phi_1)).$$

The strobe track can now be parametrised according to (10) as follows:

$$l_1(d) = e_{r,1}d + F_1, \ d > 0.$$

Corresponding computation is carried out for the other strobe track, where similar result is obtained, but with index 1 replaced with 2. Next, the representations of the strobe tracks are transformed to the ET system (1). The points of linearisation can now be computed (15) as:

$$(d_1, d_2) = \operatorname*{argmin}_{d_1, d_2 > 0}(e_{r,1}d_1 + F_1 - e_{r,2}d_2 - F_2)^2$$

The linerised normal distribution (11)–(13) for strobe track 1 is:

$$N(e_{r,1}d_1 + F_1, P_1),$$

$$P_1 = (P_{\theta\theta,1}\cos^2(\phi_1)e_{\theta,1} \otimes e_{\theta,1} + P_{\phi\phi,1}e_{\phi,1} \otimes e_{\phi,1})d_1^2.$$

$$P_1^{-1} = (P_{\theta\theta,1}^{-1}\cos^{-2}(\phi_1)e_{\theta,1} \otimes e_{\theta,1} + P_{\phi\phi,1}^{-1}e_{\phi,1} \otimes e_{\phi,1})d_1^{-2},$$

$$f_1(x) = \frac{1}{2\pi\sqrt{P_{\theta\theta,1}P_{\varphi\varphi,1}}}\exp(-(x-F_1)P^{-1}(x-F_1)/2).$$

The corresponding computation is carried out for strobe track 2. If $d_1, d_2$ do not exceed the maximum range of the sensor, the statistical distance may then be computed according to (16):

$$\frac{(F_1 - F_2) \cdot e_0}{\sqrt{(P_{\theta\theta,1}(e_0 \cdot e_{\theta,1})^2 + P_{\varphi\varphi,1}(e_0 \cdot e_{\varphi,1})^2)d_1^2 + (P_{\theta\theta,2}(e_0 \cdot e_{\theta,2})^2 + P_{\varphi\varphi,2}(e_0 \cdot e_{\varphi,2})^2)d_2^2}},$$

$$e_0 = e_{r,1} \times e_{r,2}.$$

If the statistical distance is smaller than a given a priori gate then the strobe track cross is accepted, otherwise it is rejected. In this example it is assumed to be accepted and the next step is to estimate the position of the strobe track cross (19):

$$X_{11} = (P_1^{-1} + P_2^{-1})^{-1}(P_1^{-1}F_1 + P_2^{-1}F_2),$$

$$P_{11} = (P_1^{-1} + P_2^{-1})^{-1}.$$

Since all the entries are computed in the ET-system, the strobe track cross and its covariance is obtained in the same system.

Next, the quality of the strobe track cross is computed, c.f. (26), (27):

$$XQ(X_{11}) = XQ(ST_{11})XQ(ST_{21}),$$

where $$XQ(ST_{11}) = \frac{f_1(X_{11})P(X_{11})}{f_1(X_{11})P(X_{11}) + \rho(ST_{11})P(ST_{11})},$$

$$XQ(ST_{21}) = \frac{f_2(X_{11})P(X_{11})}{f_2(X_{11})P(X_{11}) + \rho(ST_{21})P(ST_{21})}.$$

Obviously strobe track cross $X_{11}$ is the strobe track cross with highest quality, since it is the only one existing, and it will subsequently be selected. If the strobe track cross is to be used to initiate a target track, the Kalman filter state is initiated as follows, c.f. (28)–(32):

State vector $= (x, \dot{x})$ $$\text{Covariance} = \begin{pmatrix} P_{xx} & P_{x\dot{x}} \\ P_{\dot{x}x} & P_{\dot{x}\dot{x}} \end{pmatrix}$$

$$x = (P_1^{-1} + P_2^{-1})^{-1}(P_1^{-1}F_1 + P_2^{-1}F_2),$$

$$\dot{x} = (P_1^{-1} + P_2^{-1})^{-1}(P_1^{-1}m_1 + P_2^{-1}m_2),$$

where $$m_1 = d_1(\dot{\theta}_1\cos(\phi_1)e_{\theta,1} + \dot{\phi}_1 e_{\phi,1}),$$

$$m_2 = d_2(\dot{\theta}_2\cos(\phi_2)e_{\theta,2} + \dot{\phi}_2 e_{\phi,2}).$$

and $$P_{xx} = (P_1^{-1} + P_2^{-1})^{-1},$$

$$P_{\dot{x}x} = (P_1^{-1} + P_2^{-1})^{-1}(P_1^{-1}V_1P_1^{-1} + P_2^{-1}V_2P_2^{-1})(P_1^{-1} + P_2^{-1})^{-1},$$

$$P_{\dot{x}\dot{x}} = (P_1^{-1} + P_2^{-1})^{-1}(P_1^{-1}M_1P_1^{-1} + P_2^{-1}M_2P_2^{-1})(P_1^{-1} + P_2^{-1})^{-1},$$

where $$P_1^{-1}V_1P_1^{-1} \approx \left(\frac{P_{\theta\dot{\theta},1}}{P_{\theta\theta,1}^2\cos^2(\varphi_1)}e_{\theta,1} \otimes e_{\theta,1} + \frac{P_{\varphi\dot{\varphi},1}}{P_{\varphi\varphi,1}^2}e_{\varphi,1} \otimes e_{\varphi,1}\right)d_1^{-2}$$

$$P_2^{-1}V_2P_2^{-1} \approx \left(\frac{P_{\theta\dot{\theta},2}}{P_{\theta\theta,2}^2\cos^2(\varphi_2)}e_{\theta,2} \otimes e_{\theta,2} + \frac{P_{\varphi\dot{\varphi},2}}{P_{\varphi\varphi,2}^2}e_{\varphi,2} \otimes e_{\varphi,2}\right)d_2^{-2}$$

$$P_1^{-1}M_1P_1^{-1} \approx \left(\frac{P_{\dot{\theta}\dot{\theta},1}}{P_{\theta\theta,1}^2\cos^2(\varphi_1)}e_{\theta,1} \otimes e_{\theta,1} + \frac{P_{\dot{\varphi}\dot{\varphi},1}}{P_{\varphi\varphi,1}^2}e_{\varphi,1} \otimes e_{\varphi,1}\right)d_1^{-2}$$

$$P_2^{-1}M_2P_2^{-1} \approx \left(\frac{P_{\dot{\theta}\dot{\theta},2}}{P_{\theta\theta,2}^2\cos^2(\varphi_2)}e_{\theta,2} \otimes e_{\theta,2} + \frac{P_{\dot{\varphi}\dot{\varphi},2}}{P_{\varphi\varphi,2}^2}e_{\varphi,2} \otimes e_{\varphi,2}\right)d_2^{-2}.$$

EXAMPLE 2

Figure 11:
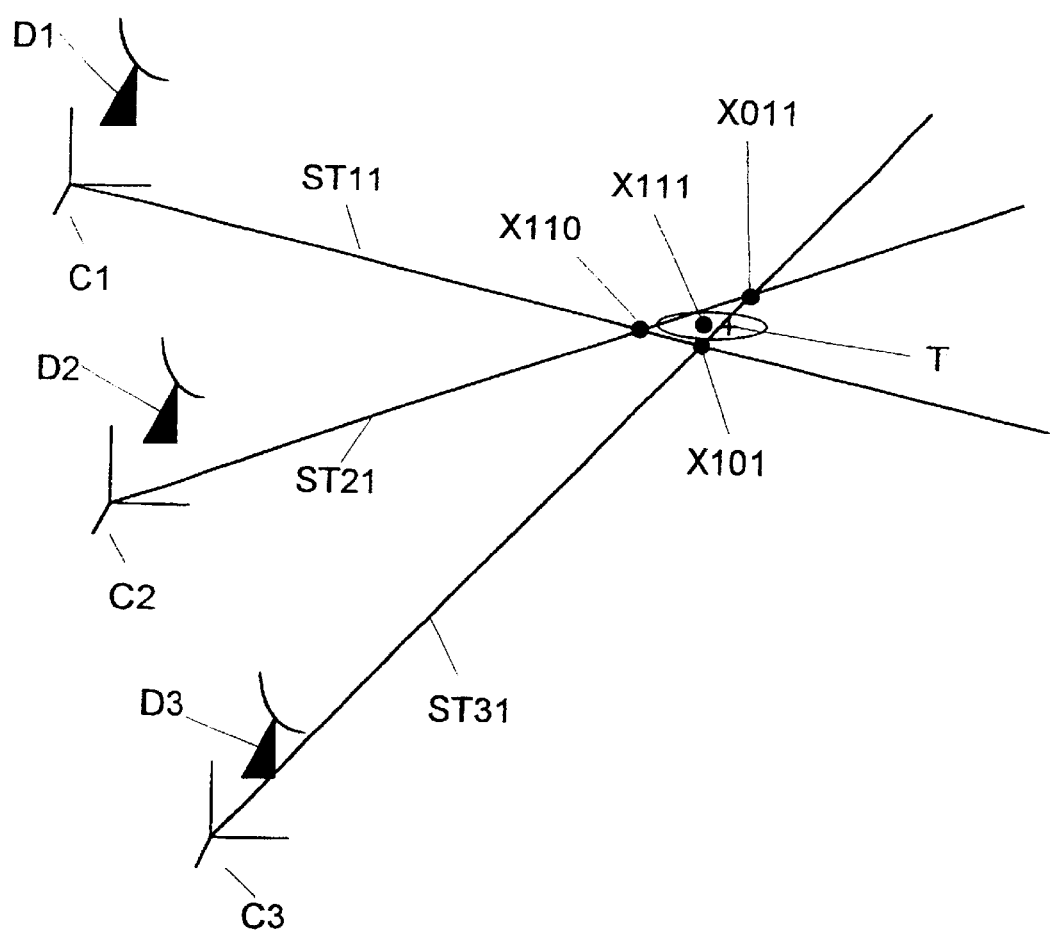
FIG. 11 is diagrammatic illustration of a tracking situation with three sensors and one true target.

In this example, three 2D sensors are used and one true target is present within the range of the sensors, as seen in FIG. 11. The strobe track crosses $(X_{110}, P_{110})$, $(X_{101}, P_{101})$ and $(X_{011}, P_{011})$, are computed as in example 1 above. To compute the 3rd order strobe track cross, the 2nd order strobe track cross between sensor 1&2 and 1&3 are compared, as described in FIG. 5 and (21) and the 3rd order strobe track cross $(X_{111}, P_{111})$ is accepted if and only if $$\sqrt{(X_{110} - X_{101})(P_{110} + P_{101})^{-1}(X_{110} - X_{101})} < \text{Predefined gate.}$$

The new estimate of the 3rd order strobe track cross is (c.f. (24)):

$$X_{111} = (P_1^{-1} + P_2^{-1} + P_3^{-1})^{-1}(P_1^{-1}F_1 + P_2^{-1}F_2 + P_3^{-1}F_3),$$

$$P_{111} = (P_1^{-1} + P_2^{-1} + P_3^{-1})^{-1}.$$

The cross quality (26) for a 2nd order strobe track cross is now $$XQ(X_{110}) = XQ(ST_{11})XQ(ST_{21}),$$

where (c.f. (27))

$$XQ(ST_{11}) = \frac{f_1(X_{110})P(X_{110})}{f_1(X_{110})P(X_{110}) + f_1(X_{101})P(X_{101}) +},$$
$$f_1(X_{111})P(X_{111}) + \rho(ST_{11})P(ST_{11})$$

$$XQ(ST_{21}) = \frac{f_2(X_{110})P(X_{110})}{f_2(X_{110})P(X_{110}) + f_2(X_{011})P(X_{011}) +}.$$
$$f_2(X_{111})P(X_{111}) + \rho(ST_{21})P(ST_{21})$$

For the 3rd order strobe track cross, the quality (26) is obtained by:

$$XQ(X_{111}) = XQ(ST_{11})XQ(ST_{21})XQ(ST_{31}),$$

where (c.f. (27))

$$XQ(ST_{11}) = \frac{f_1(X_{111})P(X_{111})}{f_1(X_{110})P(X_{110}) + f_1(X_{101})P(X_{101}) +},$$
$$f_1(X_{111})P(X_{111}) + \rho(ST_{11})P(ST_{11})$$

$$XQ(ST_{21}) = \frac{f_2(X_{111})P(X_{111})}{f_2(X_{110})P(X_{110}) + f_2(X_{011})P(X_{011}) +},$$
$$f_2(X_{111})P(X_{111}) + \rho(ST_{21})P(ST_{21})$$

$$XQ(ST_{31}) = \frac{f_3(X_{111})P(X_{111})}{f_2(X_{101})P(X_{101}) + f_2(X_{011})P(X_{011}) +}.$$
$$f_2(X_{111})P(X_{111}) + \rho(ST_{31})P(ST_{31})$$

In this example it is assumed that $XQ(X_{111}) > XQ(X_{110}) > XQ(X_{011}) > XQ(X_{101})$. Accordingly, $X_{111}$ is selected as the first strobe track cross. The strobe tracks $ST_{11}, ST_{21}, ST_{31}$, have all at least one strobe track in common with the selected strobe track cross and hence the strobe track crosses $X_{110}$, $X_{101}, X_{011}$ will be removed from the list. The list will in this example now be empty and no more strobe track crosses are selected, which is in accordance with the initial model. The result from the entire process is that the strobe track cross $(X_{111}, P_{111})$ represents the possible target position. A target track may now be initiated according to (28)–(32), compare also with example 1 above.

EXAMPLE 3

Figure 12:
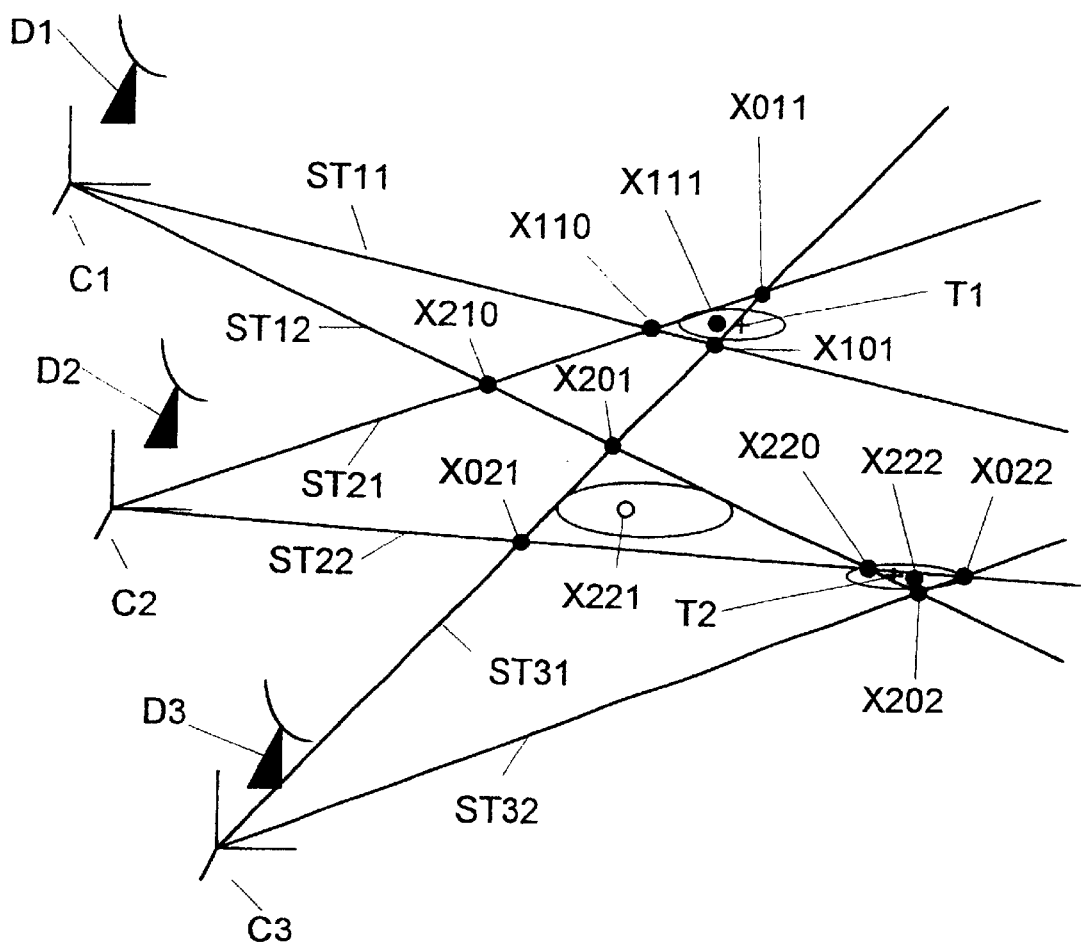
FIG. 12 is diagrammatic illustration of a tracking situation with three sensors and two true targets.

In this example, a case of three 2D-sensors and two true targets is considered, as shown in FIG. 12. The following strobe track crosses and their qualities are computed as in example 2 above: $(X_{110}, P_{110})$, $(X_{101}, P_{101})$, $(X_{011}, P_{011})$, $(X_{111}, P_{111})$, $(X_{210}, P_{210})$, $(X_{201}, P_{201})$, $(X_{021}, P_{021})$, $(X_{221}, P_{221})$, $(X_{220}, P_{220})$, $(X_{202}, P_{202})$, $(X_{022}, P_{022})$, $(X_{222}, P_{222})$. The quality calculation yields the following relations $$XQ(X_{222}) > XQ(X_{220}) > XQ(X_{111}) > \ldots$$

In accordance with the above described selection procedure, strobe track cross $(X_{222}, P_{222})$ is selected to initiate a target track in accordance with what is described in example 1 above. Subsequently, the strobe tracks $ST_{12}, ST_{22}, ST_{32}$ are considered to be consumed and hence the following strobe track crosses are removed from the list: $(X_{210}, P_{210})$, $(X_{201}, P_{201})$, $(X_{021}, P_{021})$, $(X_{221}, P_{221})$, $(X_{220}, P_{220})$, $(X_{202}, P_{202})$, $(X_{022}, P_{022})$. The next strobe track cross in the list to be selected to initiate a target track is $(X_{111}, P_{111})$. Consequently, the strobe tracks $ST_{11}, ST_{21}, ST_{31}$ are consumed and hence the following strobe track crosses are removed $(X_{110}, P_{110})$, $(X_{101}, P_{101})$, $(X_{011}, P_{011})$. The list of hypothetical target crosses is now empty and the result of the total analysis is the creation of two new target tracks based on the strobe track crosses $(X_{222}, P_{222})$ and $(X_{111}, P_{111})$.

Figure 13:
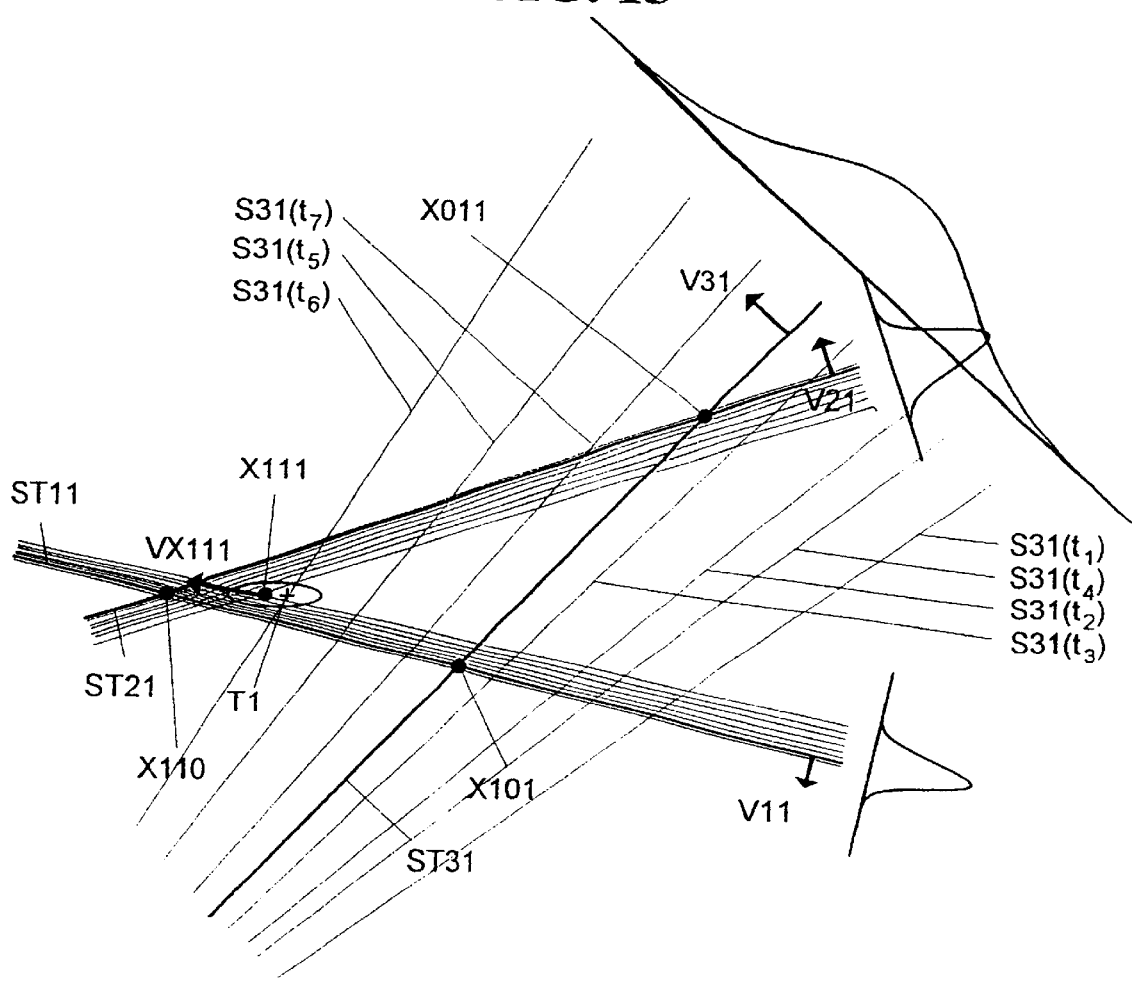
FIG. 13 is diagrammatic illustration of a part of the tracking situation in FIG. 12.

From this example, the advantages of the present invention compared to the prior art is also obvious. In FIG. 13, a part of FIG. 12 is enlarged, and for to explain the details, individual strobes, associated with the strobe tracks are shown as thin lines. As in FIG. 4, probability density functions are shown for the strobe tracks and corresponding uncertainty distributions for the individual strobes. In this example, sensor D3 has a lower accuracy in the measurement, and the distance between the probable target and the sensor is larger for sensor D3 than for the sensors D1 and D2. This results in that the PDF for the ST31 strobe track is wider than for the other participating strobe tracks ST11 and ST21. In a prior art evaluation of the 3rd order cross X111, the position of the cross would be put in the centre of gravity of the triangle built by some strobes. It is obvious that any position derived in such a way will contain a large amount of uncertainty. Since the measurements by sensors D1 and D2 are more accurate, a weighted cross position should be used. Furthermore, by using strobe tracks instead of individual strobes, a large amount of noise and uncertainty will be filtered even before creating a target track, thus giving target track initiations which are much more reliable.

By using angular velocity information from the strobe tracks, clear inconsistencies may be discovered. In the above case, the X111 strobe track cross corresponds to a true target, and thus the individual angular velocities V11, V21, V31 of the three strobe tracks are consistent with each other. The V11 and V21 angular velocities are accurate, and implies that the X111 velocity should be directed to the left in the figure, which also is confirmed by the V31 velocity. If, however, the V31 would be directed in the opposite direction and the associated uncertainty is too small to explain the divergence, the X111 strobe track cross would be possible to reject as a ghost.

EXAMPLE 4

Figure 6:
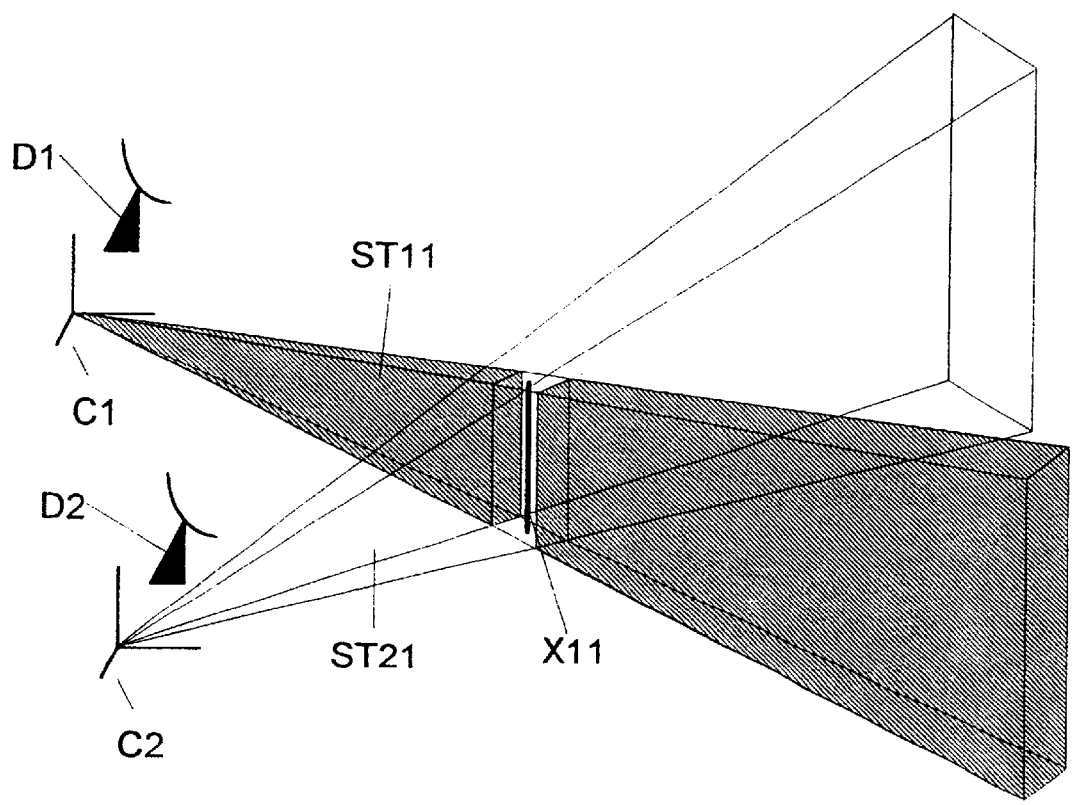
FIG. 6 is a schematic illustrating of strobe track crosses with 1D sensors.

In this example, two 1D-sensors and one target is considered, as shown in FIG. 6. Since the algorithm is performed in three dimensions and height information is completely missing, the problem in this example is singular. Therefore, it is necessary to add a priori height information. The unique strobe track cross is $(X_{11}, P_{11})$. The estimated position and its covariance is obtained from (20):

$$X_{11} = (P_h^{-1} + P_1^{-1} + P_2^{-1})^{-1}(P_h^{-1}X_0 + P_1^{-1}F_1 + P_2^{-1}F_2),$$

$$P_{11} = (P_h^{-1} + P_1^{-1} + P_2^{-1})^{-1}$$

Here $P_1, P_2, F_1, F_2$ are the same as in example 1 above. The new terms $X_0, P_h$ are needed to make $P_1^{-1} + P_2^{-1}$ invertible.

The computation is performed as follows. The intersection of the two planes representing strobe track one and two is a line which can be parametrised as $$t \rightarrow X_0 + e_R t,$$

where $X_0$ is a point on the line and $e_R$ is a unit vector parallel to the line. $X_0$ is selected so that its height over mean sea level (msl) is that of a predefined value. In this example 7000 meters is chosen. The covariance is then $$P_h = P_{RR} e_R \otimes e_R,$$

where the scalar $P_{RR}$ is selected in such a way that the targets of interest are in the height range $[7000 - \sqrt{P_{RR}}, 7000 + \sqrt{P_{RR}}]$. In this example $P_{RR} = 7000 \ast 7000$. The quality of the strobe track cross can not be computed, however, it is unique and hence selected as a possible target position.

The initial Kalman filter state is $(x,\dot{x})$, $$\begin{pmatrix} P_{xx} & P_{x\dot{x}} \\ P_{x\dot{x}} & P_{\dot{x}\dot{x}} \end{pmatrix}$$

where, according to (28), (29), (31) and (32)

$$x=(P_h^{-1}+P_1^{-1}+P_2^{-1})^{-1}(P_h^{-1}X_0+P_1^{-1}F_1+P_2^{-1}F_2),$$

$$\dot{x}=(P_h^{-1}+P_1^{-1}+P_2^{-1})^{-1}(P_1^{-1}m_1+P_2^{-1}m_2),$$

where $$m_1 = d_1\,\dot{\theta}_1\,e_{\theta,1}$$

$$m_2 = d_2\,\dot{\theta}_2\,e_{\theta,2}$$

$$P_{xx}=(P_h^{-1}+P_1^{-1}+P_2^{-1})^{-1},$$

$$P_{x\dot{x}}=(P_h^{-1}+P_1^{-1}+P_2^{-1})^{-1}(P_1^{-1}V_1P_1^{-1}+P_2^{-1}V_2P_2^{-1})(P_h^{-1}+P_1^{-1}+P_2^{-1})^{-1},$$

$$P_{\dot{x}\dot{x}}=(P_h^{-1}+P_1^{-1}+P_2^{-1})^{-1}(P_1^{-1}M_1P_1^{-1}+P_2^{-1}M_2P_2^{-1})(P_h^{-1}+P_1^{-1}+P_2^{-1})^{-1},$$

with $$P_1^{-1}V_1P_1^{-1} \approx \frac{P_{\theta\dot{\theta},1}}{P_{\theta\theta,1}^2}e_{\theta,1}\otimes e_{\theta,1}d_1^{-2},$$

$$P_2^{-1}V_2P_2^{-1} \approx \frac{P_{\theta\dot{\theta},2}}{P_{\theta\theta,2}^2}e_{\theta,2}\otimes e_{\theta,2}d_2^{-2},$$

$$P_1^{-1}M_1P_1^{-1} \approx \frac{P_{\dot{\theta}\dot{\theta},1}}{P_{\theta\theta,1}^2}e_{\theta,1}\otimes e_{\theta,1}d_1^{-2},$$

$$P_2^{-1}M_2P_2^{-1} \approx \frac{P_{\dot{\theta}\dot{\theta},2}}{P_{\theta\theta,2}^2}e_{\theta,2}\otimes e_{\theta,2}d_2^{-2}.$$

The above described method is discussed assuming the absence of atmospheric refraction. It is straightforward to someone skilled in the art to make the compensation when constructing hypothetical crosses, computing the XQ values, and in tracking association and updating. A useful default compensation is where the height above mean sea level of the target is computed with the radius of the earth changed to $kR$, with a typical value of $k=4/3$. An approximate correction of the measured elevation follows the formula:

$$-\frac{d}{2}R\cdot\frac{k-1}{k}$$

The value $k=4/3$ is dependent on the weather, type of sensors and many other parameters and may be changed readily. These compensations are, however, already known, for instance by "Introduction to Radar Systems" by Merrill I. Skolnik, McGraw-Hill Book Company, 1981, pages 447–450.

What is claimed is:

1. A track initiation method for multi target tracking by means of at least two passive sensors, comprising the steps of:

creating strobe tracks for each of the at least two sensors, where said strobe tracks are filtered sets of strobes, belonging to the same target;

calculating strobe track crosses, including a step of calculating 2nd order strobe track crosses;

selecting a strobe track cross as a probable target; and creating a target track, wherein said step of calculating 2nd order strobe track crosses comprises, for every pair of two said strobe tracks from different said sensors, the steps of:

calculating a distance between said strobe tracks;

rejecting the strobe track combination as a potential strobe track cross if the distance is larger than a predetermined value;

calculating a closest point on each strobe track corresponding to said distance between said strobe tracks;

calculating a cross-to-sensor distance between each closest point and each respective sensor;

rejecting the strobe track combination as a potential strobe track cross if at least one of the cross-to-sensor distances exceeds a range of a corresponding said sensor; and calculating position and position uncertainty for strobe track crosses of the remaining strobe tracks combinations.

2. A track initiation method according to claim 1, wherein the step of calculating strobe tracks crosses, following said step of calculating 2nd order strobe track crosses, further comprises a step of calculating strobe track crosses of order n, wherein n>2, and wherein each said calculation of strobe track crosses of order n>2 is based on strobe track crosses of order n−1.

3. A track initiation method according to claim 2, wherein said step of calculating strobe tracks crosses of order n, where n>2, further comprises steps of:

calculating a distance between a combination of two strobe track crosses of order n−1;

rejecting a potential nth order strobe track cross if the distance between said combination of two strobe track crosses of order n−1 is larger than a predetermined value; and calculating position and position uncertainty for strobe track crosses of remaining combinations of strobe track crosses of order n−1.

4. A track initiation method according to claim 1, wherein, if at least one strobe track is a 2D strobe track, said step of calculating position and position uncertainty is performed according to $$X = \left(\sum_{i=1}^{n}P_i^{-1}\right)^{-1}\left(\sum_{i=1}^{n}P_i^{-1}F_i\right),$$

$$P = \left(\sum_{i=1}^{n}P_i^{-1}\right)^{-1}$$

where $$P_i^{-1}=(P_{\theta\theta,i}^{-1}\cos^{-2}(\phi)e_{\theta,i}\otimes e_{\theta,i}+P_{\phi\phi,i}^{-1}e_{\phi,i}\otimes e_{\phi,i})d_i^{-2},$$

for a 2D strobe track, and $$P_i^{-1}=(P_{\theta\theta,i}^{-1}e_{\theta,i}\otimes e_{\theta,i})d_i^{-2}$$

for a 1D strobe track, $P_{\theta\theta,i}$ and $P_{\phi\phi,i}$ representing the state vector covariances of the strobe tracks.

5. A track initiation method according to claim 1, wherein said distance between the strobe tracks $(l_1,l_2)$ is computed according to $$Dist(l_1, l_2) = \frac{\Delta}{\sqrt{P}}$$

where $\Delta = (F_1 - F_2) \cdot e_0$,
$P = (P_{\theta\theta,1}(e_0 \cdot e_{\theta,1})^2 + P_{\phi\phi,1}(e_0 \cdot e_{\phi,1})^2) d_1^2 + (P_{\theta\theta,2}(e_0 \cdot e_{\theta,2})^2 + P_{\phi\phi,2}(e_0 \cdot e_{\phi,2})^2) d_2^2$
$l_i(d) = e_{r,i} d + F_i$, $d > 0$, $i = 1, 2$,
$(d_1, d_2) = \arg_{d_1, d_2 > 0} \min (e_{r,1} d_1 + F_1 - e_{r,2} d_2 - F_2)^2$, $F_i$ representing the foot point vectors of the respective sensors.

6. A track initiation method according to claim 3, wherein said distance between strobe track crosses is computed according to $$\text{dist}((X_1, P_1), (X_2, P_2)) = \sqrt{(X_1 - X_2)(P_1 + P_2)^{-1}(X_1 - X_2)}.$$

where the two strobe track crosses of 2nd order are represented by $(X_1, P_1)$ and $(X_2, P_2)$, respectively.

7. A track initiation method according to claim 1, wherein said step of selecting a strobe track cross as a probable target comprises the steps of:

calculating a cross quality value for each strobe track cross using the probability density functions of the strobe tracks contributing to the strobe track cross;

sorting strobe track crosses into a list in order by the cross quality value; and selecting at least one said strobe track cross from the list.

8. A track initiation method according to claim 7, wherein said cross quality value calculation uses the order of the strobe track cross.

9. A track initiation method according to claim 8, wherein said cross quality value is calculated by $$XQ(X) = \prod_{k=1 \ldots n} XQ(ST_{k,i_k}),$$

where $$XQ(ST_{k,i_k}) = \frac{f_k(X)P(X)}{\sum_{X' \in ST_{k,i_k}} f_k(X')P(X') + \rho(ST_{k,i_k})P(ST_{k,i_k})},$$

$X = X_{i_1, i_2, \ldots, i_n}$ a strobe track cross of order n, formed from strobe tracks $\{ST_{k,i_k}\}_{k=1 \ldots n}$.

10. A track initiation method according to claim 7, wherein said step of selecting a strobe track cross as a probable target further comprises the steps of:

removing those strobe track crosses, which are formed by at least one strobe track that is used for forming the selected strobe track cross, from the sorted list; and repeating the selection of strobe track crosses as probable targets until the sorted list is empty.

11. A track initiation method according to claim 7, wherein said step of selecting a strobe track cross as a probable target further comprises the step of determining if a selected strobe track cross should give rise to an automatic creation of a new target track, based on at least one of the cross quality value and the order of the strobe track cross.

12. A track initiation method according to claim 1, wherein said step of creating a target track comprises the step of calculating a target track state vector and its covariance matrix in a global tracking coordinate system.

13. A track initiation method according to claim 12, wherein said step of calculating a target track state vector and its covariance matrix is performed in a Cartesian coordinate system according to $$(x, \dot{x}), \quad \begin{pmatrix} P_{xx} & P_{x\dot{x}} \\ P_{x\dot{x}} & P_{\dot{x}\dot{x}} \end{pmatrix},$$

where $$x = \left(\sum_{i=1}^{n} P_i^{-1}\right)^{-1} \left(\sum_{i=1}^{n} P_i^{-1} F_i\right),$$

$$\dot{x} = \left(\sum_{i=1}^{n} P_i^{-1}\right)^{-1} \left(\sum_{i=1}^{n} P_i^{-1} m_i\right),$$

$$m_i = d_i(\dot{\theta}_i \cos(\varphi_i) e_{\theta,i} + \dot{\varphi}_i e_{\varphi,i}),$$

$$P_{xx} = \left(\sum_{k=1}^{n} P_k^{-1}\right)^{-1},$$

$$P_{x\dot{x}} = \left(\sum_{k=1}^{n} P_k^{-1}\right)^{-1} \left(\sum_{k=1}^{n} P_k^{-1} V_k P_k^{-1}\right) \left(\sum_{k=1}^{n} P_k^{-1}\right)^{-1},$$

$$P_{\dot{x}\dot{x}} = \left(\sum_{k=1}^{n} P_k^{-1}\right)^{-1} \left(\sum_{k=1}^{n} P_k^{-1} M_k P_k^{-1}\right) \left(\sum_{k=1}^{n} P_k^{-1}\right)^{-1},$$

with $$P^{-1} V P^{-1} \approx \left(\frac{P_{\theta\theta}}{P_{\theta\theta}^2 \cos^2(\varphi)} e_\theta \otimes e_\theta + \frac{P_{\phi\phi}}{P_{\phi\phi}^2} e_\varphi \otimes e_\varphi\right) d^{-2},$$

$$P^{-1} M P^{-1} \approx \left(\frac{P_{\theta\theta}}{P_{\theta\theta}^2 \cos^2(\varphi)} e_\theta \otimes e_\theta + \frac{P_{\varphi\varphi}}{P_{\varphi\varphi}^2} e_\varphi \otimes e_\varphi\right) d^{-2}.$$

* * * * *

UNITED STATES PATENT AND TRADEMARK OFFICE
CERTIFICATE OF CORRECTION

PATENT NO. : 6,292,136 B1
DATED : September 18, 2001
INVENTOR(S) : Egnell

It is certified that error appears in the above-identified patent and that said Letters Patent is hereby corrected as shown below:

<u>Column 4,</u>
Line 35, reads $(r,\theta,\phi) \to (r\sin(\theta)\cos(\phi), r\cos(\theta)\cos(\phi), r\sin(\phi))$ should be
$(r,\theta,\varphi) \to (r\sin(\theta)\cos(\varphi), r\cos(\theta)\cos(\varphi), r\sin(\varphi))$.

Line 37, reads "ϕ" should be -- φ --

<u>Column 5,</u>
Line 23, reads "ϕ" should be -- φ --

Line 44, reads $\theta$ and $\phi$ as well as $\dot\theta$, $\dot\phi$, $\theta$ and $\phi$ should be
$\theta$ and $\varphi$ as well as $\dot\theta$, $\dot\varphi$, $\ddot\theta$ and $\ddot\varphi$ Line 63, reads "θ = white noise" should be $\ddot\theta =$ white noise Line 65, reads $\dot\theta(t_{i+1}) = \dot\theta(t_i) + w_\theta(t_i)$ should be $\dot\theta(t_{i+1}) = \dot\theta(t_i) + w_{\dot\theta}(t_i)$ <u>Column 6,</u>
Line 14, reads "where συ² is a parameter" should be -- where $\sigma_v^2$ is a parameter --
Line 25, reads "2D-strobes $(\theta,\phi)$" should be -- 2D-strobes $(\theta,\varphi)$ --

<u>Column 8,</u>
Lines 65 and 67, the tensor product symbol ⊗ unnecessary large.

<u>Column 9,</u>
Line 13, reads $(e_r, e_\theta, e_\phi)$ should be $(e_r, e_\theta, e_\varphi)$ Lines 15-19, reads ·
$e_r = (\sin(\theta)\cos(\phi), \cos(\theta)\cos(\phi), \sin(\phi))$,
$e_\theta = (\cos(\theta)\cos(\phi), -\sin(\theta)\cos(\phi), \sin(\phi))$,
$e_\phi = (-\sin(\theta)\sin(\phi), -\cos(\theta)\sin(\phi), \cos(\phi))$.
should be
$e_r = (\sin(\theta)\cos(\varphi), \cos(\theta)\cos(\varphi), \sin(\varphi))$,
$e_\theta = (\cos(\theta)\cos(\varphi), -\sin(\theta)\cos(\varphi), \sin(\varphi))$,
$e_\varphi = (-\sin(\theta)\sin(\varphi), -\cos(\theta)\sin(\varphi), \cos(\varphi))$.

UNITED STATES PATENT AND TRADEMARK OFFICE
CERTIFICATE OF CORRECTION

PATENT NO. : 6,292,136 B1  
DATED : September 18, 2001  
INVENTOR(S) : Egnell

Page 2 of 5

It is certified that error appears in the above-identified patent and that said Letters Patent is hereby corrected as shown below:

Column 9 (cont'd),  
Line 32-34, reads
$$P = \left(P_{\theta\theta}\cos^2(\phi)e_\theta \otimes e_\theta + P_{\phi\phi}e_\phi \otimes e_\phi\right)d_0^2 .$$

$$P^{-1} = \left(P_{\theta\theta}^{-1}\cos^{-2}(\phi)e_\theta \otimes e_{\theta,i} + P_{\phi\phi}^{-1}e_\phi \otimes e_\phi\right)d_0^{-2}$$

should be
$$P = \left(P_{\theta\theta}\cos^2(\varphi)\, e_\theta \otimes e_\theta + P_{\varphi\varphi}\, e_\varphi \otimes e_\varphi\right) d_0^2 .$$

$$P^{-1} = \left(P_{\theta\theta}^{-1}\cos^{-2}(\varphi)\, e_\theta \otimes e_{\theta,i} + P_{\varphi\varphi}^{-1}\, e_\varphi \otimes e_\varphi\right) d_0^{-2}$$

Column 10,  
Lines 57-58, reads
$$P = \left(P_{\theta\theta,1}(e_0 \cdot e_{\theta,1})^2 + P_{\phi\phi,1}(e_0 \cdot e_{\phi,1})^2\right)d_1^2 + \left(P_{\theta\theta,2}(e_0 \cdot e_{\theta,2})^2 + P_{\phi\phi,2}(e_0 \cdot e_{\phi,2})^2\right)d_2^2$$

should be
$$P = \left(P_{\theta\theta,1}\,(e_0 \cdot e_{\theta,1})^2 + P_{\varphi\varphi,1}\,(e_0 \cdot e_{\varphi,1})^2\right) d_1^2 + \left(P_{\theta\theta,2}\,(e_0 \cdot e_{\theta,2})^2 + P_{\varphi\varphi,2}\,(e_0 \cdot e_{\varphi,2})^2\right) d_2^2$$

Column 11,  
Lines 31-33, reads
$$P_i = \left(P_{\theta\theta,i}\cos^2(\phi_i)e_{\theta,i} \otimes e_{\theta,i} + P_{\phi\phi,i}e_{\phi,i} \otimes e_{\phi,i}\right)d_i^2 ,$$

$$P_i^{-1} = \left(P_{\theta\theta,i}^{-1}\cos^{-2}(\phi)e_{\theta,i} \otimes e_{\theta,i} + P_{\theta\theta,i}^{-1}e_{\phi,i} \otimes e_{\phi,i}\right)d_i^{-2} ,$$

should be
$$P_i = \left(P_{\theta\theta,i}\cos^2(\varphi_i)\, e_{\theta,i} \otimes e_{\theta,i} + P_{\varphi\varphi,i}\, e_{\varphi,i} \otimes e_{\varphi,i}\right) d_i^2 ,$$

$$P_i^{-1} = \left(P_{\theta\theta,i}^{-1}\cos^{-2}(\varphi)\, e_{\theta,i} \otimes e_{\theta,i} + P_{\varphi\varphi,i}^{-1}\, e_{\varphi,i} \otimes e_{\varphi,i}\right) d_i^{-2} ,$$

Lines 36, 38 and 58, the tensor product symbol ⊗ unnecessary large.

Column 12,  
Line 55, reads
$$P_i^{-1} = \left(P_{\theta\theta,i}^{-1}\cos^{-2}(\phi)e_{\theta,i} \otimes e_{\theta,i} + P_{\phi\phi,i}^{-1}e_{\phi,i} \otimes e_{\phi,i}\right)d_i^{-2} ,$$

should be
$$P_i^{-1} = \left(P_{\theta\theta,i}^{-1}\cos^{-2}(\varphi)\, e_{\theta,i} \otimes e_{\theta,i} + P_{\varphi\varphi,i}^{-1}\, e_{\varphi,i} \otimes e_{\varphi,i}\right) d_i^{-2} ,$$

Line 59, the tensor product symbol ⊗ unnecessary large.

UNITED STATES PATENT AND TRADEMARK OFFICE
CERTIFICATE OF CORRECTION

PATENT NO. : 6,292,136 B1
DATED : September 18, 2001
INVENTOR(S) : Egnell

It is certified that error appears in the above-identified patent and that said Letters Patent is hereby corrected as shown below:

Column 15,
Lines 60-62, reads
$$V \approx (P_{\theta\theta}\cos^2(\phi)e_\theta \otimes e_\theta + P_{\phi\phi}e_\phi \otimes e_\phi)d^2 ,$$
$$M \approx (P_{\theta\theta}\cos^2(\phi)e_\theta \otimes e_\theta + P_{\phi\phi}e_\phi \otimes e_\phi)d^2$$

should be
$$V \approx (P_{\dot\theta\dot\theta}\cos^2(\varphi)\, e_\theta \otimes e_\theta + P_{\dot\varphi\dot\varphi}\, e_\varphi \otimes e_\varphi)\, d^2 ,$$
$$M \approx (P_{\theta\dot\theta}\cos^2(\varphi)e_\theta \otimes e_\theta + P_{\varphi\dot\varphi}\, e_\varphi \otimes e_\varphi)\, d^2$$

Lines 66-68, reads
$$V \approx P_{\theta\theta}e_\theta \otimes e_\theta d^2 ,$$
$$M \approx P_{\theta\theta}e_\theta \otimes e_\theta d^2$$

should be
$$V \approx P_{\dot\theta\dot\theta}\, e_\theta \otimes e_\theta\, d^2 ,$$
$$M \approx P_{\theta\dot\theta}\, e_\theta \otimes e_\theta\, d^2$$

Column 16,
Lines 64-67, reads
$$e_{r,1} = (\sin(\theta_1)\cos(\phi_1), \cos(\theta_1)\cos(\phi_1), \sin(\phi_1)),$$
$$e_{\theta,1} = (\cos(\theta_1)\cos(\phi_1), -\sin(\theta_1)\cos(\phi_1), \sin(\phi_1)) ,$$
$$e_{\phi,1} = (-\sin(\theta_1)\sin(\phi_1), -\cos(\theta_1)\sin(\phi_1), \cos(\phi_1))  .$$

should be
$$e_{r,1} = (\sin(\theta_1)\cos(\varphi_1), \cos(\theta_1)\cos(\varphi_1), \sin(\varphi_1)),$$
$$e_{\theta,1} = (\cos(\theta_1)\cos(\varphi_1), -\sin(\theta_1)\cos(\varphi_1), \sin(\varphi_1)) ,$$
$$e_{\varphi,1} = (-\sin(\theta_1)\sin(\varphi_1), -\cos(\theta_1)\sin(\varphi_1), \cos(\varphi_1))  .$$

Column 17,
Lines 20-22, reads
$$P_1 = \left(P_{\theta\theta,1}\cos^2(\phi_1)e_{\theta,1} \otimes e_{\theta,1} + P_{\phi\phi,1}e_{\phi,1} \otimes e_{\phi,1}\right)d_1^2 .$$
$$P_1^{-1} = \left(P_{\theta\theta,1}^{-1}\cos^{-2}(\phi_1)e_{\theta,1} \otimes e_{\theta,1} + P_{\phi\phi,1}^{-1}e_{\phi,1} \otimes e_{\phi,1}\right)d_1^{-2} ,$$

should be
$$P_1 = \left(P_{\theta\theta,1}\cos^2(\varphi_1)\, e_{\theta,1} \otimes e_{\theta,1} + P_{\varphi\varphi,1}\, e_{\varphi,1} \otimes e_{\varphi,1}\right)d_1^2 .$$
$$P_1^{-1} = \left(P_{\theta\theta,1}^{-1}\cos^{-2}(\varphi_1)\, e_{\theta,1} \otimes e_{\theta,1} + P_{\varphi\varphi,1}^{-1}\, e_{\varphi,1} \otimes e_{\varphi,1}\right)d_1^{-2} ,$$

UNITED STATES PATENT AND TRADEMARK OFFICE
CERTIFICATE OF CORRECTION

PATENT NO. : 6,292,136 B1
DATED : September 18, 2001
INVENTOR(S) : Egnell

It is certified that error appears in the above-identified patent and that said Letters Patent is hereby corrected as shown below:

Column 18,
Lines 17-19, reads
$$m_1 = d_1(\dot{\theta}_1 \cos(\phi_1) e_{\theta,1} + \dot{\phi}_1 e_{\phi,1}),$$
$$m_2 = d_2(\dot{\theta}_2 \cos(\phi_2) e_{\theta,2} + \dot{\phi}_2 e_{\phi,2}).$$

should be
$$m_1 = d_1(\dot{\theta}_1 \cos(\varphi_1) e_{\theta,1} + \dot{\varphi}_1 e_{\varphi,1}),$$
$$m_2 = d_2(\dot{\theta}_2 \cos(\varphi_2) e_{\theta,2} + \dot{\varphi}_2 e_{\varphi,2}).$$

Column 19,
Line 49, reads $P_{221}), (X_{220}, P_{220}), (X_{202}, P_{202}), (X022, P_{022}), (X222, P_{222})$ should be $P_{221}), (X_{220}, P_{220}), (X_{202}, P_{202}), (X_{022}, P_{022}), (X_{222}, P_{222}).$ Column 20,
Line 63, the tensor product symbol $\otimes$ unnecessary large.

Column 21,
Lines 16-18, reads
$$m_1 = d_1 \theta_1 e_{\theta,1}$$
$$m_2 = d_2 \theta_2 e_{\theta,2}.$$
should be
$$m_1 = d_1 \dot{\theta}_1 e_{\theta,1}$$
$$m_2 = d_2 \dot{\theta}_2 e_{\theta,2}.$$

Lines 20-24, reads
$$P_{\dot{x}\dot{x}} = (P_h^{-1} + P_1^{-1} + P_2^{-1})^{-1}(P_1^{-1} V_1 P_1^{-1} + P_2^{-1} V_2 P_2^{-1})(P_h^{-1} + P_1^{-1} + P_2^{-1})^{-1},$$
$$P_{x\dot{x}} = (P_h^{-1} + P_1^{-1} + P_2^{-1})^{-1}(P_1^{-1} M_1 P_1^{-1} + P_2^{-1} M_2 P_2^{-1})(P_h^{-1} + P_1^{-1} + P_2^{-1})^{-1},$$

should be
$$P_{\dot{x}\dot{x}} = (P_h^{-1} + P_1^{-1} + P_2^{-1})^{-1}(P_1^{-1} V_1 P_1^{-1} + P_2^{-1} V_2 P_2^{-1})$$
$$(P_h^{-1} + P_1^{-1} + P_2^{-1})^{-1},$$
$$P_{xx} = (P_h^{-1} + P_1^{-1} + P_2^{-1})^{-1}(P_1^{-1} M_1 P_1^{-1} + P_2^{-1} M_2 P_2^{-1})$$
$$(P_h^{-1} + P_1^{-1} + P_2^{-1})^{-1},$$

UNITED STATES PATENT AND TRADEMARK OFFICE
CERTIFICATE OF CORRECTION

PATENT NO. : 6,292,136 B1
DATED : September 18, 2001
INVENTOR(S) : Egnell

It is certified that error appears in the above-identified patent and that said Letters Patent is hereby corrected as shown below:

Column 22,
Line 57, reads $P_i^{-1} = \left(P_{\theta\theta,i}^{-1} \cos^{-2}(\phi) e_{\theta,i} \otimes e_{\theta,i} + P_{\phi\phi,i}^{-1} e_{\phi,i} \otimes e_{\phi,i}\right) d_i^{-2}$, should be $P_i^{-1} = \left(P_{\theta\theta,i}^{-1} \cos^{-2}(\varphi) e_{\theta,i} \otimes e_{\theta,i} + P_{\varphi\varphi,i}^{-1} e_{\varphi,i} \otimes e_{\varphi,i}\right) d_i^{-2}$, Line 61, the tensor product symbol ⊗ unnecessary large.
Line 63, reads "$P_{\phi\phi,i}$" should be -- $P_{\varphi\varphi,i}$ Column 23,
Lines 8-9, reads $P = \left(P_{\theta\theta,1}(e_0 \cdot e_{\theta,1})^2 + P_{\phi\phi,1}(e_0 \cdot e_{\phi,1})^2\right) d_1^2 + (P_{\theta\theta,2}(e_0 \cdot e_{\theta,2})^2 + P_{\phi\phi,2}(e_0 \cdot e_{\phi,2})^2) d_2^2$ should be $P = \left(P_{\theta\theta,1}(e_0 \cdot e_{\theta,1})^2 + P_{\varphi\varphi,1}(e_0 \cdot e_{\varphi,1})^2\right) d_1^2 + (P_{\theta\theta,2}(e_0 \cdot e_{\theta,2})^2 + P_{\varphi\varphi,2}(e_0 \cdot e_{\varphi,2})^2) d_2^2$ Lines 9-10, missing equation. should be $e_0 = e_{r,1} \times e_{r,2}$, Line 11, reads $(d_1, d_2) = \arg_{d_1,d_2>0} \min(e_{r,1} d_1 + F_1 - e_{r,2} d_2 - F_2)^2$, should be $(d_1, d_2) = \arg\min_{d_1,d_2>0} (e_{r,1} d_1 + F_1 - e_{r,2} d_2 - F_2)^2$, Signed and Sealed this Twenty-eighth Day of January, 2003

JAMES E. ROGAN
*Director of the United States Patent and Trademark Office*